United States Patent
Aonuma et al.

(10) Patent No.: US 9,898,868 B2
(45) Date of Patent: Feb. 20, 2018

(54) DISPLAY DEVICE, METHOD OF CONTROLLING THE SAME, AND PROGRAM

(71) Applicant: SEIKO EPSON CORPORATION, Tokyo (JP)

(72) Inventors: Masashi Aonuma, Shiojiri (JP); Masahide Takano, Matsumoto (JP); Kiichi Hirano, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 1 day.

(21) Appl. No.: 14/884,302

(22) Filed: Oct. 15, 2015

(65) Prior Publication Data

US 2016/0133051 A1    May 12, 2016

(30) Foreign Application Priority Data

Nov. 6, 2014  (JP) ................................ 2014-226262
May 27, 2015  (JP) ................................ 2015-107046

(51) Int. Cl.
| | |
|---|---|
| *G09G 5/14* | (2006.01) |
| *G06T 19/00* | (2011.01) |
| *G02B 27/01* | (2006.01) |
| *H04N 5/232* | (2006.01) |

(52) U.S. Cl.
CPC ........ G06T 19/006 (2013.01); G02B 27/0172 (2013.01); *G02B 2027/014* (2013.01); *G02B 2027/0138* (2013.01); *G02B 2027/0141* (2013.01); *H04N 5/23229* (2013.01); *H04N 5/23293* (2013.01)

(58) Field of Classification Search
CPC .................................................... G06T 19/006
See application file for complete search history.

(56) References Cited

U.S. PATENT DOCUMENTS

| | | | | |
|---|---|---|---|---|
| 2005/0285879 | A1* | 12/2005 | Suzuki | G06T 19/006 345/633 |
| 2012/0176525 | A1* | 7/2012 | Garin | G01C 21/20 348/333.02 |
| 2013/0314303 | A1* | 11/2013 | Osterhout | G06F 3/005 345/8 |
| 2014/0198129 | A1* | 7/2014 | Liu | G06F 3/04815 345/633 |
| 2014/0375683 | A1* | 12/2014 | Salter | G06F 3/013 345/633 |

(Continued)

FOREIGN PATENT DOCUMENTS

JP     2007-213407 A    8/2007

*Primary Examiner* — Phi Hoang
(74) *Attorney, Agent, or Firm* — Oliff PLC

(57) ABSTRACT

A head mounted display device includes an image display portion that transmits external scenery and displays an image so as to be capable of being visually recognized together with the external scenery. In addition, the head mounted display device includes a control unit that acquires an external scenery image including the external scenery which is visually recognized through the image display portion, recognizes an object which is visually recognized through the image display portion on the basis of the acquired external scenery image, and displays information regarding the object on the image display portion.

20 Claims, 21 Drawing Sheets

(56) References Cited

U.S. PATENT DOCUMENTS

| | | | | |
|---|---|---|---|---|
| 2015/0317829 A1* | 11/2015 | Carter | ................... | G02B 27/01 345/633 |
| 2015/0317956 A1* | 11/2015 | Lection | ............... | G02B 27/017 345/633 |
| 2015/0338915 A1* | 11/2015 | Publicover | ........ | H04N 5/44504 345/633 |
| 2015/0381974 A1* | 12/2015 | Hoffman | .............. | G06T 19/006 345/419 |

\* cited by examiner

DISPLAY DEVICE, METHOD OF CONTROLLING THE SAME, AND PROGRAM

BACKGROUND

1. Technical Field

The present invention relates to a display device, a method of controlling the same, and a program.

2. Related Art

Hitherto, there have been known display devices called head mounted displays (HMDs) each of which is used by being mounted on a user's head (for example, see JP-A-2007-213407). This type of display device is used for the purpose of performing a display related to a real space as disclosed in, for example, JP-A-2007-213407, but there is a problem in that a wearer is made to feel a discrepancy in a positional relationship between contents to be displayed and a real space. In order to solve such a problem, JP-A-2007-213407 discloses a configuration in which a display is corrected by detecting changes in the movement of a user's head. In the configuration disclosed in JP-A-2007-213407, the user views a display image while the user wearing the HMD, but does not view the external field thereof. For this reason, in the configuration of JP-A-2007-213407, a discrepancy between kinesthesia of a user's vestibular reflex and a display is prevented.

Incidentally, considering a configuration in which the user can visually recognize external scenery outside the HMD while the user is visually recognizing an image of the HMD, there is a problem in that the appearance of a display image of the HMD is different from that of the external scenery. That is, a range in which the user wearing the HMD visually recognizes the display image rarely conforms to a range in which the external scenery is viewed. For example, a situation may occur where the display image is viewed only as a range smaller than the range in which the external scenery is viewed. There has been a demand for a method for performing an effective display with such a configuration.

SUMMARY

An advantage of some aspects of the invention is to prevent the occurrence of a problem caused by unconformity between a range in which a display image of a display device is viewed and a range in which external scenery is viewed, when a user wears the display device and views an image and the external scenery of the display device.

A display device according to an aspect of the invention includes: a display unit that transmits external scenery and displays an image so as to be capable of being visually recognized together with the external scenery; an external scenery image acquisition unit that acquires an external scenery image including the external scenery which is visually recognized through the display unit; and a control unit that recognizes an object which is visually recognized through the display unit on the basis of the external scenery image acquired by the external scenery image acquisition unit, and displays information regarding the object on the display unit.

According to the aspect of the invention, the object which is visually recognized through the display unit is recognized on the basis of the external scenery image, and thus it is possible to display information regarding the object in accordance with the position and size of the object in external scenery which is visually recognized by a user. Therefore, it is possible to prevent unconformity between the external scenery which is visually recognized by the user and a display image and to effectively perform a display.

In the display device according to another aspect of the invention, when the object is positioned outside a range in which the information is displayed on the display unit, the control unit may perform an inducement display for inducing a line of sight to the object by the display unit.

According to the aspect of the invention with this configuration, it is possible to induce a line of sight so that the object falls within the range in which the information is displayed.

In the display device according to another aspect of the invention, the control unit may display an image of external scenery in a range, which is capable of being visually recognized through the display unit, on the display unit on the basis of the external scenery image acquired by the external scenery image acquisition unit.

According to the aspect of the invention with this configuration, it is possible to change the appearance of the image of the external scenery which is visually recognized by a user.

In the display device according to another aspect of the invention, the display unit may be a head mounted display unit to be mounted on a user's head and may include a first display unit that displays the image and a second display unit that displays an image visually recognized in a range wider than that of the first display unit on a side closer to external scenery than the first display unit, and the control unit may perform an inducement display for inducing a line of sight to the object by the second display unit. According to the aspect of the invention with this configuration, when the head mounted display device performs a display using two display units, it is possible to prevent unconformity between external scenery which is visually recognized by a user and a display image. In addition, it is possible to induce the user's line of sight to the outside of the display image in a state where the display image is visually recognized by the user.

In the display device according to another aspect of the invention, the display unit may be a head mounted display unit to be mounted on a user's head and may include a line-of-sight detection unit that detects a line of sight of the user, and the control unit may change a display of the display unit in accordance with a direction of the user's line of sight which is detected by the line-of-sight detection unit.

According to the aspect of the invention with this configuration, it is possible to make a display image correspond to the user's line of sight and to more effectively prevent unconformity between the external scenery which is visually recognized by the user and the display image.

In the display device according to another aspect of the invention, the control unit may display a partial region of the external scenery image acquired by the external scenery image acquisition unit on the display unit, and change a position of the partial region displayed on the display unit in the external scenery image, in accordance with the direction of the user's line of sight detected by the line-of-sight detection unit.

According to the aspect of the invention with this configuration, the external scenery image is displayed in association with the user's line of sight, and thus it is possible to prevent unconformity between external scenery which is visually recognized by the user and a display image and to make the user visually recognize the external scenery image.

The display device according to another aspect of the invention may further include an image capturing unit that captures an image of a range including external scenery which is visually recognized through the display unit, in which the external scenery image acquisition unit may acquire the image captured by the image capturing unit as the external scenery image.

According to the aspect of the invention with this configuration, it is possible to acquire an external scenery image corresponding to external scenery which is visually recognized by a user without preparing the external scenery image in advance and to display the image.

In the display device according to another aspect of the invention, the external scenery image acquisition unit may acquire a plurality of captured images captured by the image capturing unit and compound the captured images into the external scenery image.

According to the aspect of the invention with this configuration, it is possible to obtain the external scenery image having a preferable size and angle of view without being restricted by an angle of view of the image capturing unit, and the like.

The display device according to another aspect of the invention may further include a plurality of the image capturing units, in which the external scenery image acquisition unit may acquire a plurality of captured images captured respectively by the plurality of image capturing units, and compound the captured images into the external scenery image.

According to the aspect of the invention with this configuration, it is possible to obtain the external scenery image having a preferable size and angle of view by using the plurality of captured images.

The display device according to another aspect of the invention may further include a connection portion which is connected to an external device, in which the external scenery image acquisition unit may acquire the external scenery image from the external device which is connected to the connection portion.

According to the aspect of the invention with this configuration, it is possible to acquire the external scenery image without storing the external scenery image in advance or providing a unit performing image capturing.

The display device according to another aspect of the invention may further include a position detection unit that detects a present position, in which the external scenery image acquisition unit may acquire the external scenery image corresponding to the present position which is detected by the position detection unit from the external device which is connected to the connection portion.

According to the aspect of the invention with this configuration, it is possible to acquire the external scenery image corresponding to the position of the display device.

In the display device according to another aspect of the invention, the control unit may recognize the object by extracting an image of the object from the external scenery image acquired by the external scenery image acquisition unit.

According to the aspect of the invention with this configuration, it is possible to promptly detect the position of the object using the external scenery image.

Here, the control unit may recognize the object by detecting an image of the object which is set in advance from the external scenery image and specifying the position of the detected image in the external scenery image. In addition, an object to be recognized may be set in the control unit in advance, and data regarding the object may be stored in the storage unit in advance. Here, the data stored is data for detecting and recognizing the object, and examples of the data include a feature amount of the image of the object, and the like. For example, when the object is a thing, feature amounts indicating the color, shape, and the other features of a captured image when an image of the thing is captured are included in set data. In this case, the control unit performs a process of extracting the image of the thing from image data of an external scenery image, calculates a feature amount of the extracted image of the thing, and compares and collates the calculated feature amount with a feature amount included in data which is stored in advance. When the feature amounts are values close to each other or the same value, it is possible to determine that the thing of the image extracted from the external scenery image conforms to the object, and the thing is recognized as an object. In addition, when data of a plurality of feature amounts regarding the object is stored, the control unit may recognize the object from the external scenery image on the basis of the plurality of feature amounts. In addition, the control unit may detect a distance to the object using a distance detection unit that detects a distance to an object, and may recognize the object on the basis of the detected distance. In addition, a method of recognizing the object from the external scenery image includes not only acquiring the external scenery image and performing a process based on the feature amount, but also selecting the object from the thing included in the external scenery image, or the like in response to an instruction of a human (user) who uses the display device. In this case, the user's instruction may be an instruction based on a sound, or may be an operation using a finger or the like with respect to an operation unit included in the display device. In addition, when the display device includes a mechanism that recognizes a gesture operation, a user may designate a object by the gesture operation and may recognize the designated object from external scenery.

A display device according to another aspect of the invention is a display device to be mounted on a user's head, and includes: a display unit having a display region that transmits external scenery and displays an image so as to be capable of being visually recognized together with the external scenery; and a control unit that recognizes an object which is positioned outside a range capable of being visually recognized through the display region, and outputs information regarding the object.

According to the aspect of the invention, even when an object drawing a user's attention is not located at a position capable of being visually recognized so as to overlap the display region, it is possible to provide information regarding the object to the user.

In the display device according to another aspect of the invention, when the object is positioned outside a range capable of being visually recognized through the display unit, the control unit may output information for inducing the user to be in a state where the object is capable of being visually recognized.

According to the aspect of the invention with this configuration, when an object drawing a user's attention is not located at a position capable of being visually recognized by the user through the display unit, it is possible to output information regarding the object. Therefore, it is possible to induce, for example, the user's line of sight toward the object.

In the display device according to another aspect of the invention, when the object is visually recognized through an outer side of the display region in the display unit, the control unit may output the information for inducing the user to be in a state where the object is capable of being visually recognized through the display region.

According to the aspect of the invention with this configuration, when an object drawing a user's attention is located at a position capable of being visually recognized by the user through the display unit and is not located at a position which is visually recognized so as to overlap the display region, it is possible to allow the object to be visually recognized by inducing the user's line of sight.

In the display device according to another aspect of the invention, the control unit may display a character and/or an image constituting the information in a display region of the display unit. In addition, in the display device according to the aspect of the invention, the device may further include a sound output unit that outputs a sound, in which the control unit may output a sound constituting the information by the sound output unit.

In the display device according to another aspect of the invention, the control unit may acquire positional information indicating a position of the object, obtain relative positions of a range which is visually recognized by the user through the display region and the object on the basis of the acquired positional information, and output the information.

According to the aspect of the invention with this configuration, it is possible to induce the user to face the direction of the object by outputting information in accordance with the position of the object, regardless of the position of the object. Therefore, for example, even when the object is not located at a position where the object can be captured and visually recognized from the display device, it is possible to output information.

In the display device according to another aspect of the invention, the control unit may acquire an external scenery image obtained by capturing an image of the external scenery, obtain relative positions of a range which is visually recognized by the user through the display region and the object on the basis of the acquired external scenery image, and output the information.

According to the aspect of the invention with this configuration, it is possible to display information regarding the object in accordance with the position of the object in the external scenery which is visually recognized by the user. Therefore, it is possible to prevent unconformity between the external scenery which is visually recognized by the user and a display image and to effectively perform a display.

A method of controlling a display device according to still another aspect of the invention includes controlling a display device including a display unit that transmits external scenery and displays an image so as to be capable of being visually recognized together with the external scenery; acquiring an external scenery image including the external scenery which is visually recognized through the display unit; recognizing an object which is visually recognized through the display unit on the basis of the acquired external scenery image; and displaying information regarding the object on the display unit.

According to the aspect of the invention, the object which is visually recognized through the display unit is recognized on the basis of the external scenery image, and thus it is possible to display information regarding the object in accordance with the position and size of the object in the external scenery which is visually recognized by the user. Therefore, it is possible to effectively perform a display corresponding to the external scenery which is visually recognized by the user.

A program according to yet another aspect of the invention causes a computer, which controls a display device including a display unit that transmits external scenery and displays an image so as to be capable of being visually recognized together with the external scenery, to function as: an external scenery image acquisition unit that acquires an external scenery image including the external scenery which is visually recognized through the display unit; and a control unit that recognizes an object which is visually recognized through the display unit on the basis of the external scenery image acquired by the external scenery image acquisition unit, and displays information regarding the object on the display unit.

According to the aspect of the invention, the object which is visually recognized through the display unit is recognized on the basis of the external scenery image by controlling the display device, and thus it is possible to display information regarding the object in accordance with the position and size of the object in the external scenery which is visually recognized by the user. Therefore, it is possible to effectively perform a display corresponding to the external scenery which is visually recognized by the user.

A program according to still yet another aspect of the invention causes a computer, which controls a display device including a display unit having a display region that transmits external scenery and displays an image so as to be capable of being visually recognized together with the external scenery, to function as: a control unit that recognizes an object which is positioned outside a range capable of being visually recognized through the display region, and outputs information regarding the object.

According to the aspect of the invention, even when an object drawing a user's attention is not located at a position capable of being visually recognized so as to overlap the display region, it is possible to provide information regarding the object to the user.

BRIEF DESCRIPTION OF THE DRAWINGS

The invention will be described with reference to the accompanying drawings, wherein like numbers reference like elements.

FIG. 10A illustrates a user's field of view, FIG. 10B illustrates an example of an external scenery image, and FIG. 10C illustrates a display example of an inducement image.

FIG. 11A illustrates an example of a reduction display, FIG. 11B illustrates an example in which a gazing direction is detected, and FIG. 11C illustrates a display example in which enlargement is performed in a gazing direction.

FIG. 13A illustrates an example of an inducement operation using an image, and FIG. 13B illustrates an example of an inducement operation using an image and text.

FIG. 15A illustrates an example in which a marker is used as an operation object, FIG. 15B illustrates an operation example with respect to a marker, and FIG. 15C illustrates another example of an operation with respect to markers.

FIG. 17A illustrates a user's field of view, FIG. 17B illustrates an example of an external scenery image, and FIG. 17C illustrates a display example of an external scenery image.

FIG. 21A illustrates an example of displays on a right transparent LCD and a left transparent LCD, FIG. 21B illustrates an example of a display using half mirrors, and FIG. 21C illustrates a state where displays overlap each other.

DESCRIPTION OF EXEMPLARY EMBODIMENTS

First Embodiment

Figure 1:
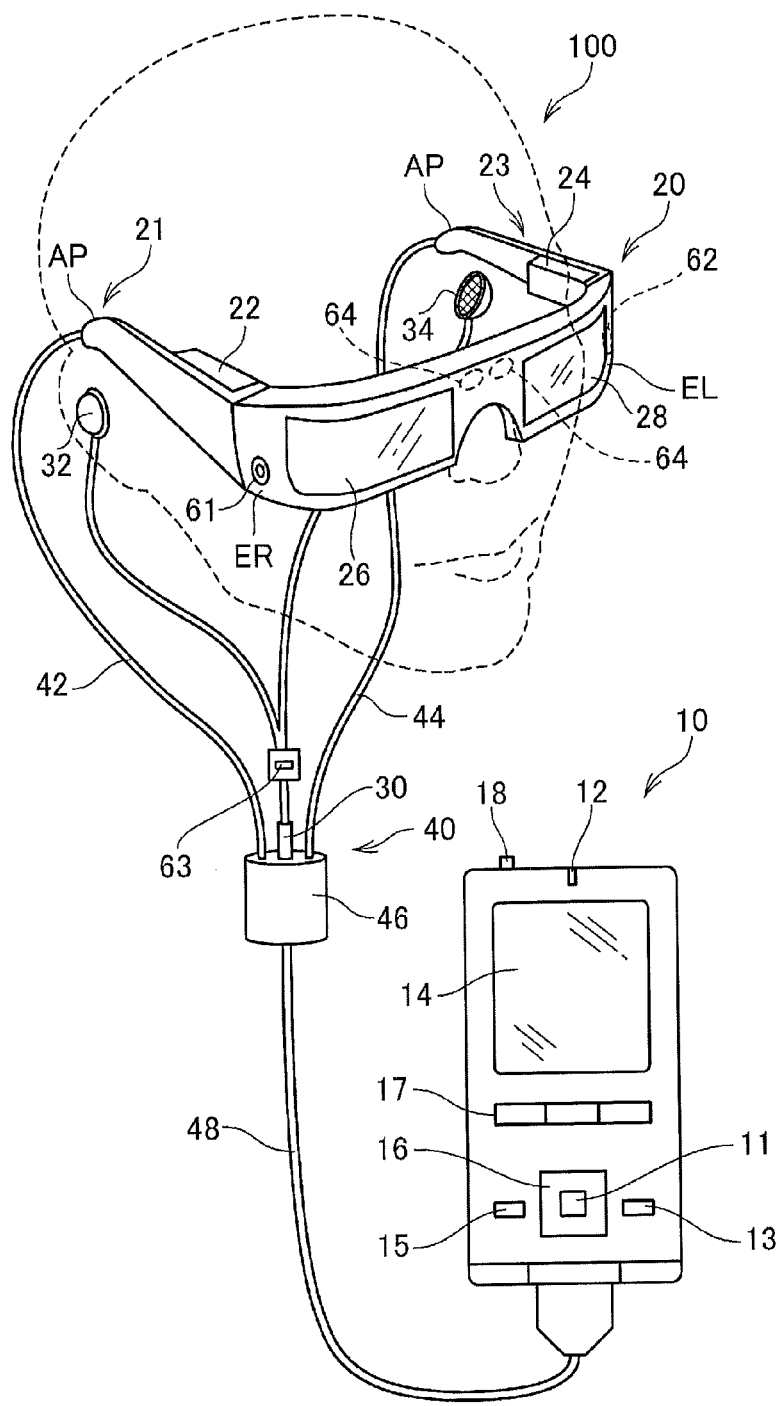
FIG. 1 is a diagram illustrating an exterior configuration of a head mounted display device according to a first embodiment.

FIG. 1 is a diagram illustrating an exterior configuration of a head mounted display device 100 (display device) according to an embodiment to which the invention is applied.

The head mounted display device 100 includes an image display portion 20 that makes a user visually recognize a virtual image in a state where the image display portion is worn on the user's head, and a control device 10 that controls the image display portion 20. The control device 10 functions as a controller for a user to operate the head mounted display device 100.

The image display portion 20 is a mounted body which is to be mounted on a user's head, and has a spectacle shape in this embodiment. The image display portion 20 includes a right holding portion 21, a right display driving portion 22, a left holding portion 23, a left display driving portion 24, a right optical image display portion 26, a left optical image display portion 28, a right camera 61 (image capturing unit), a left camera 62 (image capturing unit), a microphone 63, and a distance sensor 64. The right optical image display portion 26 and the left optical image display portion 28 are disposed so as to be positioned in front of the user's right eye and the user's left eye, respectively, when the user wears the image display portion 20. One end of the right optical image display portion 26 and one end of the left optical image display portion 28 are connected to each other at a position corresponding to the user's glabella when the user wears the image display portion 20.

The right holding portion 21 is a member provided to extend from an end ER, which is the other end of the right optical image display portion 26, to a position corresponding to the user's temporal region when the user wears the image display portion 20. Similarly, the left holding portion 23 is a member provided to extend from an end EL, which is the other end of the left optical image display portion 28, to a position corresponding to the user's temporal region when the user wears the image display portion 20. The right holding portion 21 and the left holding portion 23 hold the image display portion 20 on the user's head in a manner of temples (bows) of spectacles.

The right display driving portion 22 and the left display driving portion 24 are disposed on sides facing the user's head when the user wears the image display portion 20. Meanwhile, the right display driving portion 22 and the left display driving portion 24 are also collectively referred to as a "display driving portion", and the right optical image display portion 26 and the left optical image display portion 28 are also collectively referred to as an "optical image display portion".

The display driving portions 22 and 24 include liquid crystal displays 241 and 242 (hereinafter, referred to as "LCDs 241 and 242") and projection optical systems 251 and 252 to be described later with reference to FIGS. 2 to 4, respectively.

The right optical image display portion 26 and the left optical image display portion 28 include light guide plates 261 and 262 (FIG. 2), respectively, and a light control plate 20A. The light guide plates 261 and 262 are formed of a light transmissive resin, or the like, and guide image light output from the display driving portions 22 and 24 to user's eyes. The light control plate 20A is an optical element having a thin plate shape, and is disposed so as to cover the front of the image display portion 20 which is opposite to the user's eyes. As the light control plate 20A, various types of plates such as a plate hardly having light transmittance, a plate close to a transparent plate, a plate transmitting light by attenuating the amount of light, and a plate attenuating or reflecting light having a specific wavelength can be used. The amount of external light incident on the right optical image display portion 26 and the left optical image display portion 28 from the outside is adjusted by appropriately selecting optical characteristics (light transmittance and the like) of the light control plate 20A, and thus it is possible to adjust the easiness of visual recognition of a virtual image. In this embodiment, a description will be given of a case where the light control plate 20A having at least such light transmittance that a user wearing the head mounted display device 100 can visually recognize an external scene is used. The light control plate 20A protects the right light guide plate 261 and the left light guide plate 262, and suppresses damages of the right light guide plate 261 and the left light guide plate 262, the adhesion of dirt, and the like.

The light control plate 20A may be configured to be attached and detached to and from the right optical image display portion 26 and the left optical image display portion 28, or a plurality of types of light control plates 20A may be installed to be exchanged.

The right camera 61 is disposed at an end on the right holding portion 21 side on the front face of the head mounted display device 100. In addition, the left camera 62 is disposed at an end on the left holding portion 23 side on the front face of the head mounted display device 100. The right camera 61 and the left camera 62 are digital cameras including an image capturing element such as a CCD or a CMOS, an imaging lens, and the like, and may be monocular cameras or stereo cameras.

The right camera 61 and the left camera 62 capture an image of at least a portion of external scenery in a front direction of the head mounted display device 100, in other words, in a direction of a user's visual field in a state where the user is wearing the head mounted display device 100. The width of an angle of view of each of the right camera 61 and the left camera 62 can be appropriately set. However, in this embodiment, the angle of view includes an external field which is visually recognized by a user through the right optical image display portion 26 and the left optical image display portion 28 as described later. Further, it is more preferable that image capturing ranges of the right camera 61 and the left camera 62 are set so as to be able to capture an image of the entire visual field of the user through the light control plate 20A.

The right camera 61 and the left camera 62 perform image capturing under the control of an image acquisition unit 161 (FIG. 3A) included in the control unit 140, and output the captured image data to the image acquisition unit 161.

The distance sensor 64 is disposed at a boundary portion between the right optical image display portion 26 and the left optical image display portion 28. In a state where a user is wearing the image display portion 20, the distance sensor 64 is positioned at the substantially center between the both eyes of the user in a horizontal direction and is positioned at an upper side than the user's both eyes in a vertical direction.

The distance sensor 64 detects a distance to a measurement target positioned in a measurement direction which is set in advance. The distance sensor 64 includes a light source such as, for example, an LED or a laser diode, and a light receiving unit that receives light which is emitted from the light source and is reflected from the measurement target. In this case, the distance sensor 64 performs a triangular range-finding process or a range-finding process based on a time difference under the control of a position detection unit 162 to be described later. In addition, the distance sensor 64 may be configured to include a sound source that emits ultrasonic waves, and a detection unit that receives ultrasonic waves reflected from a measurement target. In this case, the distance sensor 64 performs a range-finding process based on a time difference up to the reflection of ultrasonic waves, under the control of the position detection unit 162 to be described later. Meanwhile, the distance sensor 64 includes a light source and a light receiving unit, or a sound source and a detection unit, and the position detection unit 162 may perform a range-finding process.

The measurement direction of the distance sensor 64 of this embodiment is a front direction of the head mounted display device 100, and overlaps image capturing directions of the right camera 61 and the left camera 62.

Figure 2:
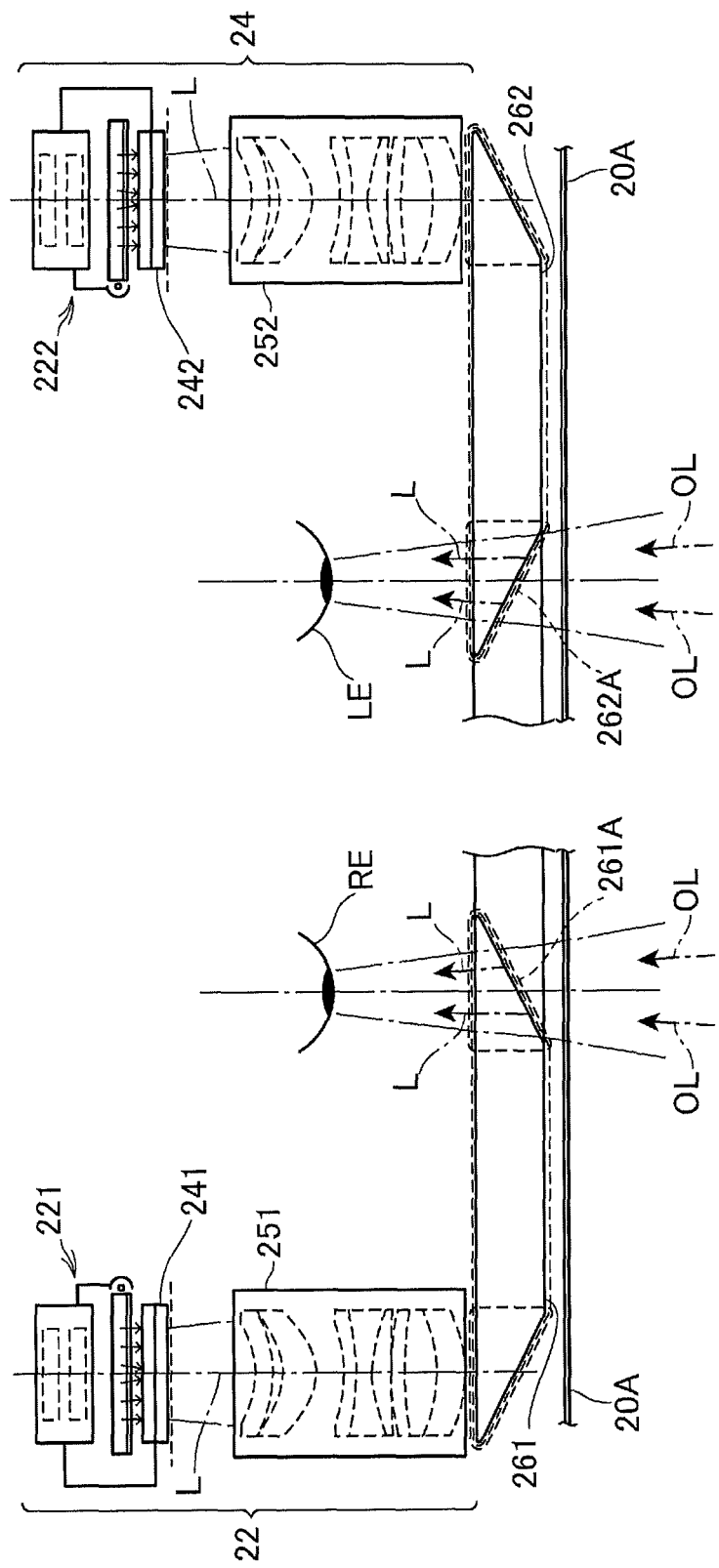
FIG. 2 is a diagram illustrating a configuration of an optical system of an image display portion.

FIG. 2 is a plan view illustrating main components in a configuration of an optical system included in the image display portion 20. In FIG. 2, a left eye LE and a right eye RE of a user are illustrated for a description.

The left display driving portion 24 includes a left backlight 222 including a light source such as an LED and a diffusion plate, a transmissive left LCD 242 which is disposed on a light path of light emitted from the diffusion plate of the left backlight 222, and a left projection optical system 252 including a lens group that guides image light L passing through the left LCD 242, and the like. The left LCD 242 is a transmissive liquid crystal panel in which a plurality of pixels are disposed in a matrix. The left projection optical system 252 includes a collimator lens that converts the image light L emitted from the left LCD 242 into a luminous flux in a parallel state. The image light L converted into the luminous flux in a parallel state by the collimator lens is incident on the left light guide plate 262. The left light guide plate 262 is a prism in which a plurality of reflecting surfaces reflecting the image light L are formed, and the image light L is guided to the left eye LE side through a plurality of times of reflection inside the left light guide plate 262. The left light guide plate 262 is provided with a half mirror 262A (reflecting surface) which is positioned in front of the left eye LE.

The image light L reflected from the half mirror 262A is emitted from the left optical image display portion 28 toward the left eye LE, and the image light L forms an image on a retina of the left eye LE to thereby make the user visually recognize the image.

The right display driving portion 22 is configured to be laterally symmetrical to the left display driving portion 24. The right display driving portion 22 includes a right backlight 221 including a light source such as an LED and a diffusion plate, a transmissive right LCD 241 which is disposed on a light path of light emitted from the diffusion plate of the right backlight 221, and a right projection optical system 251 including a lens group that guides image light L passing through the right LCD 241, and the like. The right LCD 241 is a transmissive liquid crystal panel in which a plurality of pixels are disposed in a matrix.

The right projection optical system 251 includes a collimator lens that converts the image light L emitted from the right LCD 241 into a luminous flux in a parallel state.

The image light L converted into the luminous flux in a parallel state by the collimator lens is incident on the right light guide plate 261. The right light guide plate 261 is a prism in which a plurality of reflecting surfaces reflecting the image light L are formed, and the image light L is guided to the right eye RE side through a plurality of times of reflection inside the right light guide plate 261. The right light guide plate 261 is provided with a half mirror 261A (reflecting surface) which is positioned in front of the right eye RE.

The image light L reflected from the half mirror 261A is emitted from the right optical image display portion 26 toward the right eye RE, and the image light L forms an image on a retina of the right eye RE to thereby make the user visually recognize the image.

The image light L reflected from the half mirror 261A and external light OL having passed through the light control plate 20A are incident on the right eye RE of the user. The image light L reflected by the half mirror 262A and the external light OL having passed through the light control plate 20A are incident on the left eye LE. In this manner, the head mounted display device 100 makes the image light L of an image processed therein and the external light OL being superimposed on each other incident on the user's eyes so that the user views external scenery through the light control plate 20A and visually recognizes an image according to the image light L so as to be superimposed on the external scenery. In this manner, the head mounted display device 100 functions as a see-through type display device.

Meanwhile, the left projection optical system 252 and the left light guide plate 262 are also collectively referred to as a "left light guide portion", and the right projection optical system 251 and the right light guide plate 261 are collectively referred to as a "right light guide portion". Configurations of the right light guide portion and the left light guide portion are not limited to the above-mentioned examples. Any configuration can be used as long as a virtual image is formed in front of user's eyes using image light. For example, a diffraction grating may be used, or a translucent reflection film may be used.

The image display portion 20 is connected to the control device 10 through a connection portion 40. The connection portion 40 includes a main cord 48 which is connected to the control device 10, a right cord 42, a left cord 44, and a connection member 46. The right cord 42 and the left cord 44 are cords into which the main cord 48 is branched. The right cord 42 is inserted into a housing of the right holding portion 21 from a distal end AP of the right holding portion 21 in an extension direction, and is connected to the right display driving portion 22. Similarly, the left cord 44 is inserted into a housing of the left holding portion 23 from a distal end AP of the left holding portion 23 in an extension direction, and is connected to the left display driving portion 24.

The connection member 46 is provided at a branch point between the main cord 48 and the right and left cords 42 and 44, and includes a jack for connection to an earphone plug 30. A right earphone 32 and a left earphone 34 extend from the earphone plug 30. The microphone 63 is provided in the vicinity of the earphone plug 30. A portion from the earphone plug 30 to the microphone 63 is integrated into one cord, and the cord is branched from the microphone 63 to be connected to the right earphone 32 and the left earphone 34.

Figure 4:
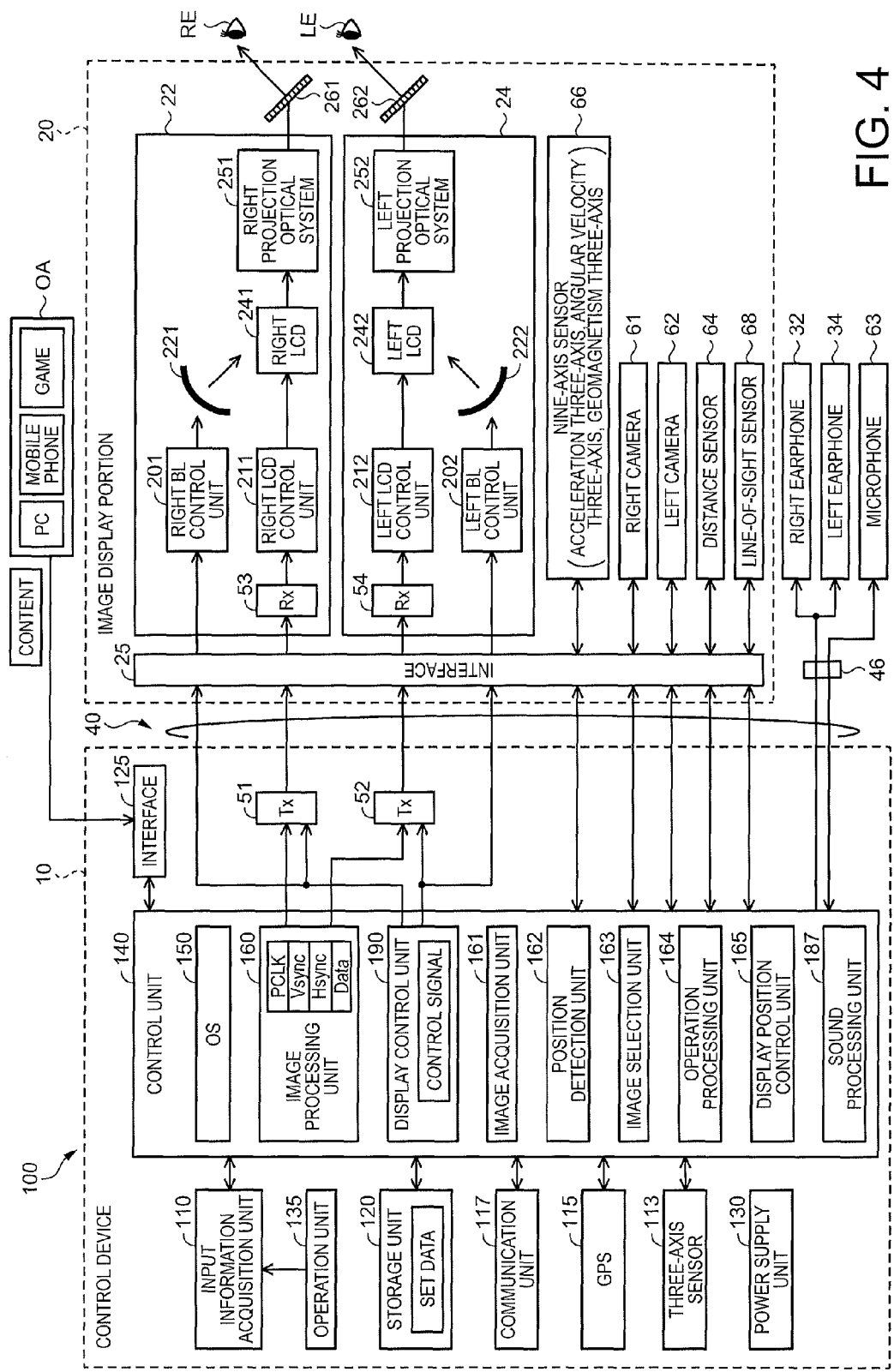
FIG. 4 is a functional block diagram illustrating units constituting the head mounted display device.

For example, as illustrated in FIG. 1, the microphone 63 is configured such that a sound collection unit of the microphone 63 is disposed so as to face a user's line of sight direction, collects a sound, and outputs a sound signal to a sound processing unit 187 (FIG. 4). The microphone 63 may be, for example, a monaural microphone or a stereo microphone, and may be a directional microphone or may be a nondirectional microphone.

The right cord 42, the left cord 44, and the main cord 48 may be configured to be able to transmit digital data, and can be constituted by, for example, a metal cable or optical fiber. In addition, a configuration may be adopted in which the right cord 42 and the left cord 44 are integrated into one cord.

The image display portion 20 and the control device 10 transmit various types of signals through the connection portion 40. Connectors (not shown) fitted to each other are provided at an end of the main cord 48 which is opposite to the connection member 46 and at the control device 10, respectively. It is possible to fit the connector of the main cord 48 and the connector of the control device 10 to each other or to separate the control device 10 and the image display portion 20 from each other by releasing the fitting.

The control device 10 controls the head mounted display device 100. The control device 10 includes switches including a determination key 11, a lighting unit 12, a display switching key 13, a luminance switching key 15, a direction key 16, a menu key 17, and a power switch 18. In addition, the control device 10 includes a track pad 14 which is operated by a user's finger.

The determination key 11 detects a pressing operation to thereby output a signal for determining contents operated by the control device 10. The lighting unit 12 includes a light source such as a light emitting diode (LED), and gives notice of an operation state (for example, ON/OFF of a power supply) of the head mounted display device 100 according to a lighting state of the light source. The display switching key 13 outputs, for example, a signal for giving an instruction of switching between display modes of an image according to a pressing operation.

The track pad 14 has an operation surface for detecting a contact operation, and outputs an operation signal according to an operation with respect to the operation surface. A method of performing detection on the operation surface is not limited, and an electrostatic method, a pressure detection method, an optical method, or the like can be adopted. The luminance switching key 15 outputs a signal for giving an instruction of an increase or decrease in the luminance of the image display portion 20 according to a pressing operation. The direction key 16 outputs an operation signal according to pressing operations with respect to keys corresponding to vertical and horizontal directions. The power switch 18 is a switch that switches the power-on and power-off of the head mounted display device 100.

Figure 3A:
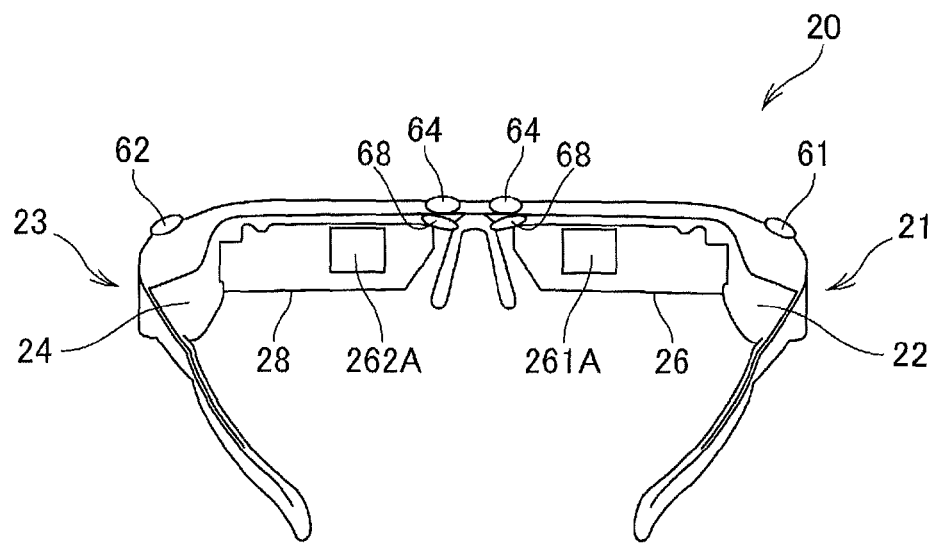
FIGS. 3A and 3B are diagrams illustrating main components of the image display portion.
Figure 3B:
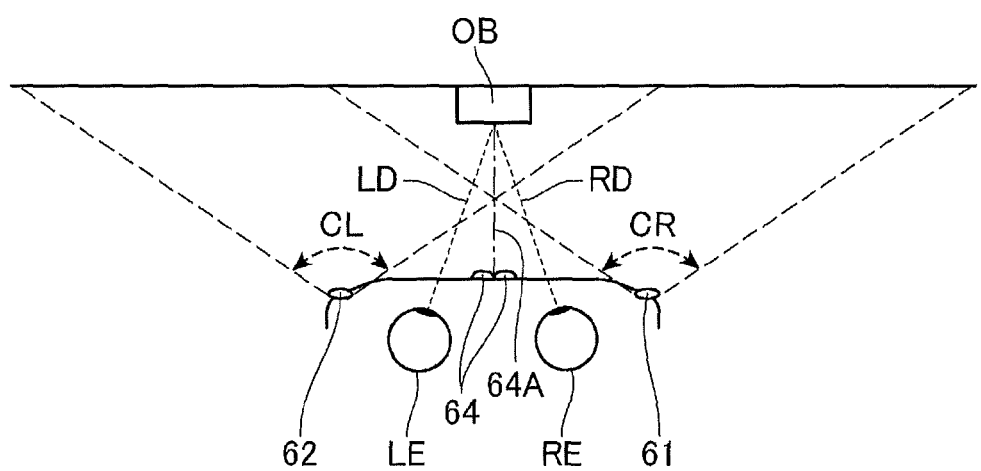

FIGS. 3A and 3B are diagrams illustrating main components of the image display portion 20. FIG. 3A is a perspective view illustrating main components when the image display portion 20 is viewed from a user's head side, and FIG. 3B is a diagram illustrating angles of view of the right camera 61 and the left camera 62. Meanwhile, in FIG. 3A, the right cord 42, the left cord 44, and the like which are connected to the image display portion 20 are not illustrated.

FIG. 3A illustrates a side of the image display portion 20 which comes into contact with a user's head, in other words, a side viewed from a right eye RE and a left eye LE of the user. In other words, the back sides of the right optical image display portion 26 and left optical image display portion 28 are viewed.

In FIG. 3A, the half mirror 261A irradiating the user's right eye RE with image light and the half mirror 262A irradiating the user's left eye LE with image light are viewed as substantially quadrangular regions. In addition, the entirety of the right optical image display portion 26 and the left optical image display portion 28 respectively including the half mirrors 261A and 262A transmits external light as described above. For this reason, external scenery is allowed to be visually recognized or seen by the user through the entirety of the right optical image display portion 26 and the left optical image display portion 28, and a rectangular display image is visually recognized by the user at the positions of the half mirrors 261A and 262A. The head mounted display device 100 may be referred to as an optical see-through device.

As described above, the right camera 61 is disposed at an end on the right holding portion 21 side so as to face the front side of the image display portion 20, and the left camera 62 is disposed at an end on the left holding portion 23 side. In addition, the distance sensor 64 is disposed at the center between the right optical image display portion 26 and the left optical image display portion 28 so as to face the front side.

FIG. 3B is a schematic diagram illustrating the positions of the right camera 61, the left camera 62, and the distance sensor 64 when viewed from a right eye RE and a left eye LE of a user and viewed in a plan view. An angle of view (image capturing range) of the right camera 61 is denoted by CR, and an angle of view (image capturing range) of the left camera 62 is denoted by CL. Meanwhile, although FIG. 3B illustrates the angles of view CR and CL in a horizontal direction, real angles of view of the right camera 61 and the left camera 62 are expanded in the same manner as a general digital camera.

The angle of view CR and the angle of view CL are substantially laterally symmetrical to the central position of the image display portion 20, and both the angle of view CR and the angle of view CL include a right front direction of the central position of the image display portion 20. For this reason, the angles of view CR and CL overlap each other at the front of the central position of the image display portion 20.

For example, as illustrated in FIG. 3B, when an object OB is present in the front direction of the image display portion 20, the object OB is included in both the angle of view CR and the angle of view CL. For this reason, the object OB is seen in both a captured image obtained by the right camera 61 and a captured image obtained by the left camera 62. Here, when a user gazes at the object OB, a user's line of sight is directed to the object OB as indicated by signs RD and LD in the drawing. In general, a human's angle of view is approximately 200 degrees in a horizontal direction and approximately 125 degrees in a vertical direction. Here, an effective field of view which is excellent in information receiving capacity is approximately 30 degrees in the horizontal direction and is approximately 20 degrees in the vertical direction. Further, a stable field of view having a gaze point, which is gazed at by a human, viewed rapidly and stably is set to be approximately 60 degrees to 90 degrees in the horizontal direction and is set to be approximately 45 degrees to 70 degrees in the vertical direction.

Accordingly, when the gaze point is the object OB, an effective field of view is approximately 30 degrees in the horizontal direction and is approximately 20 degrees in the vertical direction centering on the lines of sight RD and LD, a stable field of view is approximately 60 degrees to 90 degrees in the horizontal direction and is approximately 45 degrees to 70 degrees in the vertical direction, and an angle of view is approximately 200 degrees in the horizontal direction and is approximately 125 degrees in the vertical direction.

In addition, a real field of view which is visually recognized by a user wearing the head mounted display device 100 through the right and left optical image display portions 26 and 28 of the image display portion 20 is referred to as a real field of view (FOV). In the configuration of this embodiment illustrated in FIGS. 1 and 2, a real field of view is equivalent to a real field of view which is visually recognized by a user through the right optical image display portion 26 and the left optical image display portion 28. The real field of view is narrower than the angle of view and the stable field of view which are described with reference to FIG. 3B, but is wider than the effective field of view.

It is preferable that the right camera 61 and the left camera 62 can capture an image of a range wider than a user's field of view. Specifically, it is preferable that the entirety of the angles of view CR and CL is wider than at least a user's effective field of view. In addition, it is more preferable that the entirety of the angles of view CR and CL is wider than a user's real field of view. It is further preferable that the entirety of the angles of view CR and CL is wider than a user's stable field of view, and it is most preferable that the entirety of the angles of view CR and CL is wider than a user's angle of view.

For this reason, the right camera 61 and the left camera 62 are disposed so that the angle of view CR and the angle of view CL overlap each other at the front of the image display portion 20 as illustrated in FIG. 3B. In addition, the right camera 61 and the left camera 62 may be configured as wide-angle cameras. That is, the right camera 61 and the left camera 62 include a so-called wide-angle lens as an imaging lens, and may be configured to be able to image a wide angle of view. The wide-angle lens may include lenses called a superwide-angle lens and a semiwide-angle lens. The wide-angle lens may be a single focal lens or a zoom lens, or the right camera 61 and the left camera 62 may include a lens group constituted by a plurality of lenses. In addition, the angle of view CR of the right camera 61 and the angle of view CL of the left camera 62 may not be the same angle. In addition, an image capturing direction of the right camera 61 and an image capturing direction of the left camera 62 are not required to be completely parallel to each other. When a captured image obtained by the right camera 61 and a captured image obtained by the left camera 62 are superimposed on each other, a range wider than a user's field of view may be captured. In FIG. 3B, a detection direction of the distance sensor 64 is denoted by reference numeral 64A. In this embodiment, the distance sensor 64 is configured to be able to detect a distance between the central position of the image display portion 20 and a thing positioned in the front direction, and detects a distance to, for example, the object OB. Since a user wearing the head mounted display device 100 turns his or her head in a gazing direction, it can be considered that an object which is gazed at is positioned at the front of the image display portion 20. Therefore, the distance sensor 64 disposed at the center of the image display portion 20 can detect a distance to the object which is gazed at by the user when the front of the image display portion 20 is set to be the detection direction 64A.

In addition, as illustrated in FIG. 3A, line-of-sight sensors 68 are disposed on the user side of the image display portion 20. The pair of line-of-sight sensors 68 are provided at the central position between the right optical image display portion 26 and the left optical image display portion 28 so as to correspond to the right eye RE and the left eye LE of the user, respectively. For example, the line-of-sight sensors 68 are configured as a pair of cameras that capture images of the right eye RE and the left eye LE of the user. The line-of-sight sensor 68 performs image capturing under the control of the control unit 140 (FIG. 4), and the control unit 140 detects reflected light on the surfaces of eyeballs of the right eye RE and the left eye LE and images of pupils from captured image data to thereby specify a line-of-sight direction.

FIG. 4 is a functional block diagram of units constituting the head mounted display device 100.

The head mounted display device 100 includes an interface 125 for connecting various external devices OA serving as supply sources of contents. The interface 125 may be an interface such as, for example, a USB interface, a micro USB interface, or an interface for a memory card, which is suited to wired connection, and may be configured as a wireless communication interface. The external device OA is an image supply device that supplies an image to the head mounted display device 100, and may be a personal computer (PC), a mobile phone terminal, a portable game machine, or the like.

The control device 10 includes a control unit 140, an input information acquisition unit 110, a storage unit 120, a transmission unit (Tx) 51, and a transmission unit (Tx) 52.

The input information acquisition unit 110 is connected to an operation unit 135. The operation unit 135 includes the track pad 14, the direction key 16, the power switch 18, and the like which are mentioned above, and the input information acquisition unit 110 acquires input contents on the basis of a signal which is input from the operation unit 135. In addition, the control device 10 includes a power supply unit (not shown), and supplies power to units of the control device 10 and the image display portion 20.

The storage unit 120, which is a nonvolatile storage device, stores various computer programs and data related to the programs. In addition, the storage unit 120 may store data of a still image or a moving image which is displayed on the image display portion 20.

The storage unit 120 stores set data 121. The set data 121 includes various set values which are used by the control unit 140. The set values included in the set data 121 may be values which are input in advance by the operation of the operation unit 135, or may be stored by being received from the external device OA or another device (not shown) through a communication unit 117 or the interface 125.

A three-axis sensor 113, a GPS 115, a communication unit 117, and a sound recognition unit 114 are connected to the control unit 140. The three-axis sensor 113 is a triaxial acceleration sensor, and the control unit 140 acquires a detected value of the three-axis sensor 113. The control unit 140 can detect the movement of the control device 10 using the three-axis sensor 113, and can detect, for example, an operation of shaking the control device 10. In addition, the three-axis sensor 113 may be replaced with a nine-axis sensor. In this case, the control unit 140 acquires detected values of a triaxial acceleration sensor, a triaxial angular velocity sensor, and a triaxial geomagnetic sensor, and can detect, for example, the posture, orientation, and movement of the control device 10.

The GPS 115 includes an antenna (not shown), receives a global positioning system (GPS) signal, and calculates the present position of the control device 10. The GPS 115 outputs a present position and a present time which are obtained on the basis of the GPS signal to the control unit 140. In addition, the GPS 115 acquires a present time on the basis of information included in the GPS signal, and may have a function of correcting a time clocked by the control unit 140.

The communication unit 117 performs wireless data communication according to a standard such as wireless LAN (WiFi (registered trademark)), Miracast (registered trademark), or Bluetooth (registered trademark).

When the external device OA is connected to the communication unit 117 in a wireless manner, the control unit 140 acquires content data from the communication unit 117, and displays an image on the image display portion 20. On the other hand, when the external device OA is connected to the interface 125 in a wired manner, the control unit 140 acquires content data from the interface 125, and displays an image on the image display portion 20. The communication unit 117 and the interface 125 function as data acquisition units DA that acquire content data from the external device OA.

The control unit 140 includes a CPU (not shown) that executes a program, a RAM (not shown) that temporarily stores the program executed by the CPU or data, and a ROM (not shown) that stores a basic control program executed by the CPU or data in a nonvolatile manner. The control unit 140 reads and executes a computer program stored in the storage unit 120 and functions as an operating system (OS) 150, an image processing unit 160, an image acquisition unit 161, a position detection unit 162, an image selection unit 163, an operation processing unit 164, a display position control unit 165, a sound processing unit 187, and a display control unit 190.

The image processing unit 160 acquires an image signal included in a content. The image processing unit 160 separates a synchronization signal such as a vertical synchronization signal VSync or a horizontal synchronization signal HSync from the acquired image signal. In addition, the image processing unit 160 generates a clock signal PCLK using a phase locked loop (PLL) circuit (not shown) and the like according to a period of the vertical synchronization signal VSync or the horizontal synchronization signal HSync which is separated. The image processing unit 160 converts an analog image signal obtained by separating the synchronization signal into a digital image signal using an A/D conversion circuit (not shown) or the like. The image processing unit 160 stores the converted digital image signal in the RAM of the control unit 140 for each frame as image data (Data in the drawing) of an object image. The image data is, for example, RGB data.

Meanwhile, the image processing unit 160 may perform a resolution conversion process of converting a resolution of image data into a resolution suitable for the right display driving portion 22 and the left display driving portion 24 when necessary. In addition, the image processing unit 160 may perform an image adjustment process of adjusting the luminance and chroma of image data, a 2D/3D conversion process of creasing 2D image data from 3D image data or generating 3D image data from 2D image data, and the like.

The image processing unit 160 transmits the clock signal PCLK, the vertical synchronization signal VSync, the horizontal synchronization signal HSync, and image data Data stored in a RAM through the transmission units 51 and 52. The transmission units 51 and 52 function as transceivers, and perform serial transmission between the control device 10 and the image display portion 20. Meanwhile, the image data Data transmitted through the transmission unit 51 is referred to as "right eye image data", and the image data Data transmitted through the transmission unit 52 is referred to as "left eye image data".

The display control unit 190 generates a control signal for controlling the right display driving portion 22 and the left display driving portion 24, and controls the generation and emission of image light using each of the right display driving portion 22 and the left display driving portion 24 on the basis of the control signal. Specifically, the display control unit controls drive ON/OFF of the right LCD 241 by the right LCD control unit 211 and drive ON/OFF of the right backlight 221 by a right backlight control unit 201. In addition, the display control unit 190 controls drive ON/OFF of the left LCD 242 by the left LCD control unit 212 and drive ON/OFF of the left backlight 222 by a left backlight control unit 202.

The sound processing unit 187 acquires a sound signal included in a content, amplifies the acquired sound signal, and outputs the amplified sound signal to the right earphone 32 and the left earphone 34. In addition, the sound processing unit 187 acquires a sound which is collected by the microphone 63, and converts the sound into digital sound data. The sound processing unit 187 may perform a process which is set in advance on the digital sound data.

The image display portion 20 includes the right camera 61, the left camera 62, and the distance sensor 64 which are mentioned above. In addition, the image display portion 20 includes an interface 25, a right display driving portion 22, a left display driving portion 24, a right light guide plate 261 as the right optical image display portion 26, a left light guide plate 262 as the left optical image display portion 28, a nine-axis sensor 66, and the line-of-sight sensor 68.

The nine-axis sensor 66 is a motion sensor that detects acceleration (three-axis), angular velocity (three-axis), and geomagnetism (three-axis). When the image display portion 20 is worn on a user's head, the control unit 140 can detect the movement of the user's head on the basis of a detected value of the nine-axis sensor 66. For example, the control unit 140 can estimate the size and orientation of inclination of the image display portion 20 on the basis of a detected value of the nine-axis sensor 66.

The interface 25 includes a connector to which the right cord 42 and the left cord 44 are connected. The interface 25 outputs the clock signal PCLK, the vertical synchronization signal VSync, the horizontal synchronization signal HSync, and the image data Data, which are transmitted from the transmission unit 51, to corresponding reception units (Rx) 53 and 54. In addition, the interface 25 outputs a control signal transmitted from the display control unit 190 to the corresponding reception units 53 and 54, the right backlight control unit 201, or the left backlight control unit 202.

In addition, the interface 25 is an interface for connection to the right camera 61, the left camera 62, the distance sensor 64, the nine-axis sensor 66, and the line-of-sight sensor 68. Pieces of image capturing data of the right camera 61 and the left camera 62, detection results of the distance sensor 64, detection results of acceleration (three-axis), angular velocity (three-axis), geomagnetism (three-axis) by the nine-axis sensor 66, and detection results of the line-of-sight sensor 68 are transmitted to the control unit 140 through the interface 25.

The right display driving portion 22 includes the right backlight 221, the right LCD 241, and the right projection optical system 251 which are mentioned above. In addition, the right display driving portion 22 includes the reception unit 53, the right backlight (BL) control unit 201 controlling the right backlight (BL) 221, and the right LCD control unit 211 driving the right LCD 241.

The reception unit 53 operates as a receiver corresponding to the transmission unit 51, and performs serial transmission between the control device 10 and the image display portion 20. The right backlight control unit 201 drives the right backlight 221 on the basis of a control signal which is input. The right LCD control unit 211 drives the right LCD 241 on the basis of the clock signal PCLK, the vertical synchronization signal VSync, the horizontal synchronization signal HSync, and the right eye image data Data which are input through the reception unit 53.

The left display driving portion 24 has the same configuration as that of the right display driving portion 22. The left display driving portion 24 includes the left backlight 222, the left LCD 242, and the left projection optical system 252 which are mentioned above. In addition, the left display driving portion 24 includes the reception unit 54, the left backlight control unit 202 driving the left backlight 222, and the left LCD control unit 212 driving the left LCD 242.

The reception unit 54 operates as a receiver corresponding to the transmission unit 52, and performs serial transmission between the control device 10 and the image display portion 20. The left backlight control unit 202 drives the left backlight 222 on the basis of a control signal which is input. The left LCD control unit 212 drives the left LCD 242 on the basis of the clock signal PCLK, the vertical synchronization signal VSync, the horizontal synchronization signal HSync, and the right eye image data Data which are input through the reception unit 54.

Meanwhile, the right backlight control unit 201, the right LCD control unit 211, the right backlight 221, and the right LCD 241 are also collectively referred to as a right "image light generation unit". Similarly, the left backlight control unit 202, the left LCD control unit 212, the left backlight 222, and the left LCD 242 are also collectively referred to as a left "image light generation unit".

As illustrated in FIG. 3A, a range in which a user wearing the head mounted display device 100 visually recognizes image light emitted from the half mirrors 261A and 262A is smaller than a real field of view. For example, when the head mounted display device 100 displays an image exhibiting an augmented reality (AR) effect (hereinafter, referred to as an AR image), the head mounted display device displays the AR image so as to overlap an object OB at which a user gazes. In this case, an AR effect is obtained by the AR image being viewed so as to overlap the object OB, but a range in which the AR image is visually recognized is restricted by the sizes of the half mirrors 261A and 262A. For this reason, even when the object OB is included in the real field of view, a case where it is difficult to display the AR image at a position overlapping the object OB is also considered. In addition, even when an image other than the AR image is displayed, there is a possibility of a region, in which the head mounted display device 100 can display the image, being smaller than a real field of view due to the restriction of function.

Consequently, the head mounted display device 100 performs a display corresponding to external scenery such as a display of an AR content corresponding to an object OB in the external scenery at which a user gazes, using an image of external scenery in a range wider than a user's real field of view such as captured images obtained by the right camera 61 and the left camera 62 or an image which is provided in advance.

The image acquisition unit 161 acquires an external scenery image corresponding to a present position of the head mounted display device 100. The external scenery image includes captured images obtained by the right camera 61 and the left camera 62 or an image which is acquired from an external device capable of communication through the communication unit 117. A process for the image acquisition unit 161 to acquire the external scenery image will be described later.

The position detection unit 162 performs a function for the control unit 140 to detect (recognize) a target (object) from an external scenery image. In this function, the position detection unit 162 analyzes, for example, the external scenery image acquired by the image acquisition unit 161. The position detection unit 162 detects an image of a target from the external scenery image and specifies the position of the detected image in the external scenery image to thereby detect the position of the object at which a user gazes. This process will be described later. In addition, the position detection unit 162 may detect the position of the target by measuring a distance to the target which is detected by controlling the distance sensor 64, or may detect the position of the target by processing the external scenery image and using the distance detected by the distance sensor 64.

The image selection unit 163 selects an AR content to be displayed among AR contents which are input to the interface 125 from the external device OA.

The operation processing unit 164 detects the movement of the image display portion 20 on the basis of a detected value of the nine-axis sensor 66, and the like and performs a process corresponding to the movement of the image display portion 20. The movement of the image display portion 20 can be regarded as the movement of a head of a user wearing the head mounted display device 100. In addition, the operation processing unit 164 detects a direction of a user's line of sight by controlling the line-of-sight sensor 68.

The display position control unit 165 performs a control related to display positions of AR images of the right display driving portion 22 and the left display driving portion 24 in accordance with the position of a target which is detected by the position detection unit 162, the movement of the image display portion 20 which is detected by the operation processing unit 164, and/or a direction of a user's line of sight.

Figure 5:
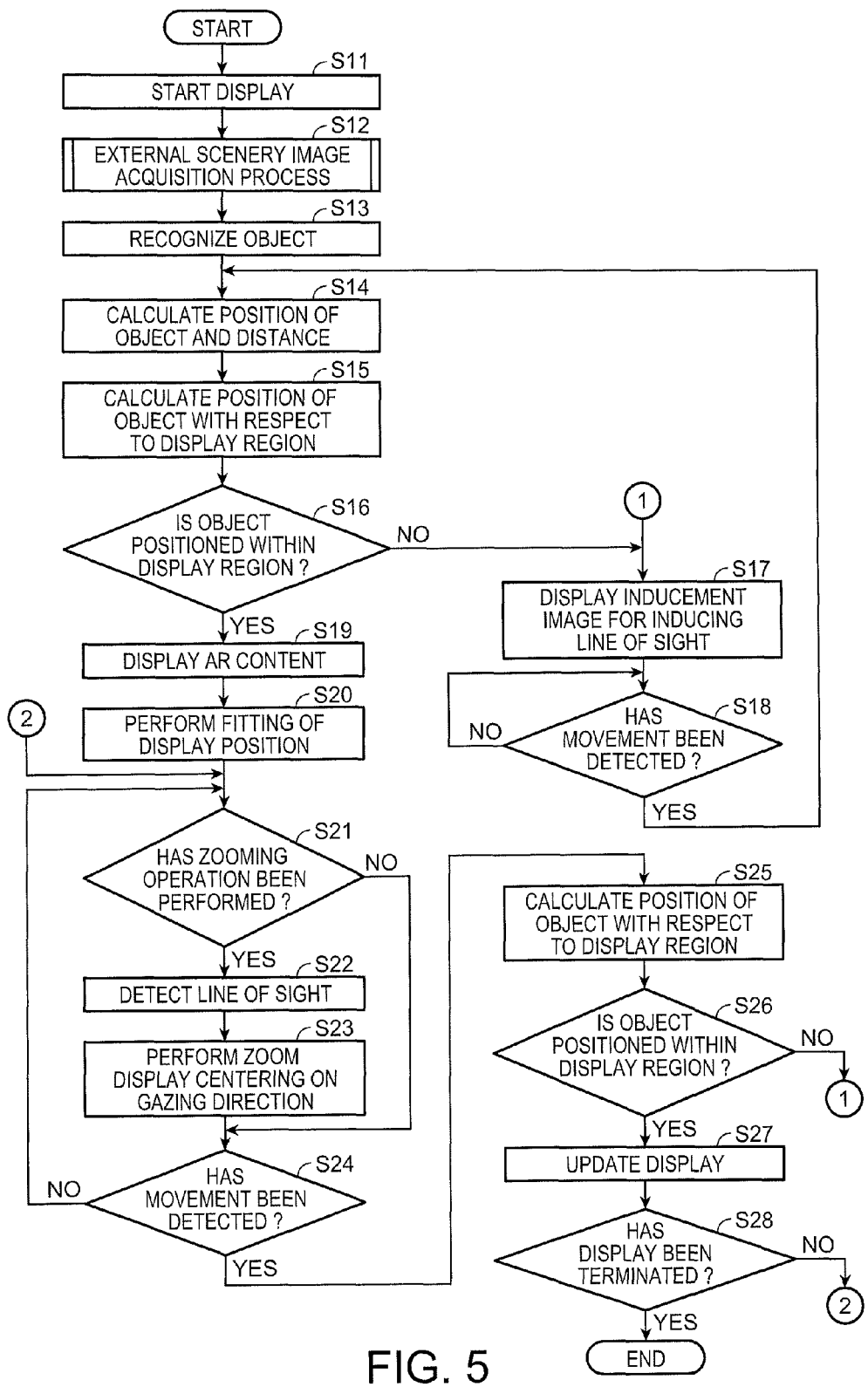
FIG. 5 is a flow chart illustrating an operation of the head mounted display device according to the first embodiment.

FIG. 5 is a flow chart illustrating an operation of the head mounted display device 100. When a user wears the head mounted display device 100 and an instruction for a display of an AR content is given by the operation of the operation unit 135, the control unit 140 starts an operation related to the display (step S11).

The control unit 140 performs an external scenery image acquisition process by the image acquisition unit 161 (step S12). There are three specific modes of the external scenery image acquisition process.

Figure 6:
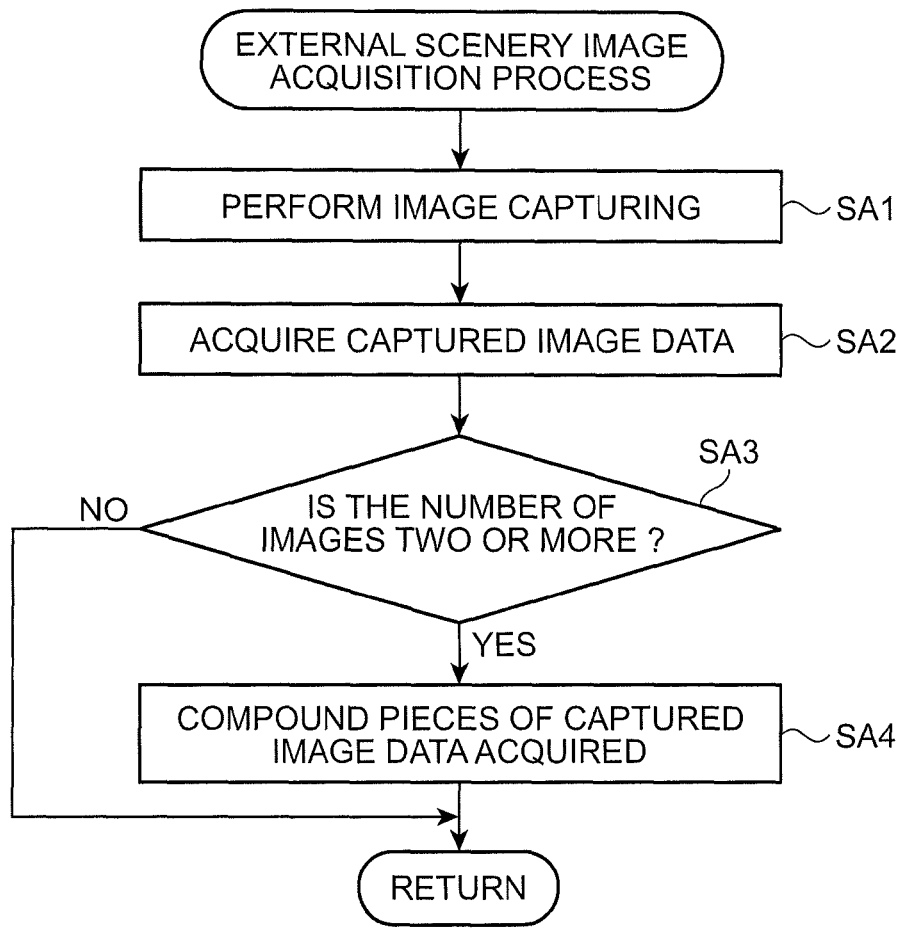
FIG. 6 is a flow chart illustrating a first mode of an external scenery image acquisition process.

FIG. 6 is a flow chart illustrating a first mode of the external scenery image acquisition process in step S12. In the first mode, the image acquisition unit 161 controls the right camera 61 and the left camera 62 to perform image capturing (step SA1) and acquires captured image data (step SA2).

The image acquisition unit 161 determines whether the number of pieces of captured image data acquired is two or more (step SA3). In the head mounted display device 100 of the embodiment, two of the right camera 61 and the left camera 62 individually output captured image data, and thus the image acquisition unit 161 acquires a plurality of pieces of captured image data (step SA3; YES), and compounds the pieces of captured image data acquired to thereby obtain external scenery image data (step SA4). In addition, when the number of pieces of captured image data acquired in step SA2 is one (step SA3; NO), the image acquisition unit 161 sets the acquired captured image data as external scenery image data. Examples of a case where the number of pieces of captured image data is one include a case where one captured image data in a range in which the right camera 61 and the left camera 62 capture an image is input to the control unit 140, a case where either one of the right camera 61 and the left camera 62 is set to be used, a case where one camera is provided, and the like.

Figure 7:
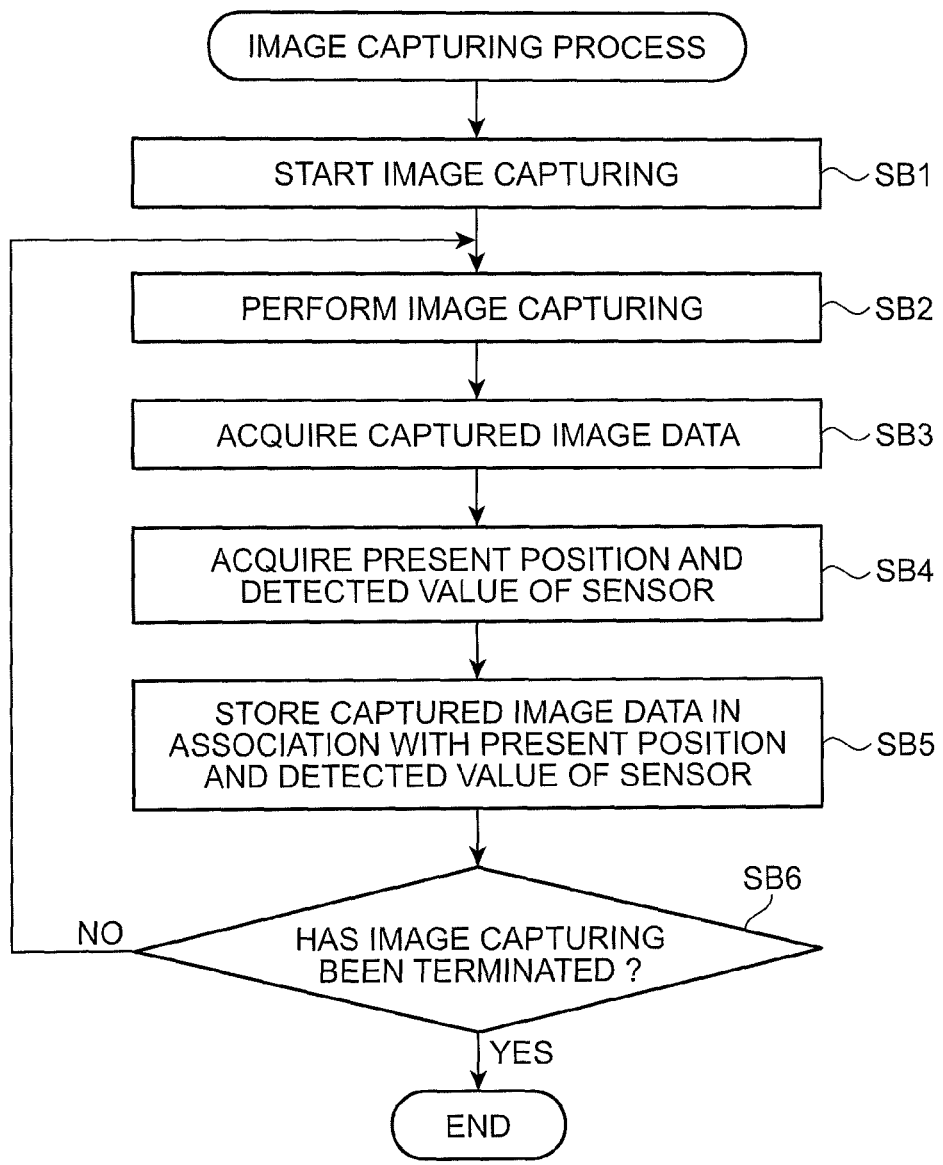
FIG. 7 is a flow chart illustrating an image capturing process according to a second mode of the external scenery image acquisition process.
Figure 8:
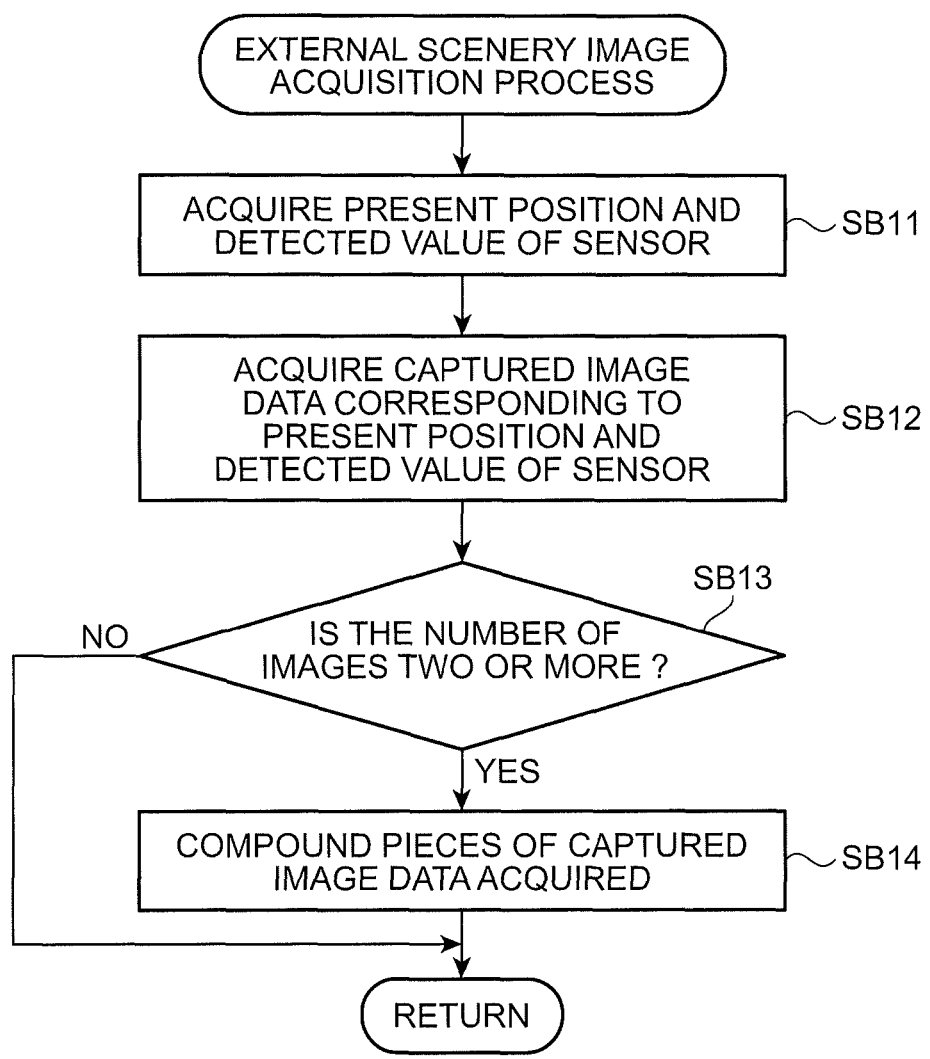
FIG. 8 is a flow chart illustrating the second mode of the external scenery image acquisition process.

FIGS. 7 and 8 illustrate a second mode of the external scenery image acquisition process. FIG. 7 is a flow chart illustrating an image capturing process, and FIG. 8 is a flow chart illustrating an external scenery image acquisition process.

In the second mode, the image acquisition unit 161 performs image capturing at fixed time intervals by the right camera 61 and the left camera 62 during an operation of the head mounted display device 100. That is, the image acquisition unit 161 starts an image capturing operation using the start of an operation of the head mounted display device 100 and the start of a display of an AR content as triggers (step SB1), and performs image capturing by the right camera 61 and the left camera 62 (step SB2).

The image acquisition unit 161 acquires captured image data obtained by performing image capturing using the right camera 61 and the left camera 62 (step SB3). Subsequently, the image acquisition unit 161 acquires coordinates of a present position of the head mounted display device 100 by the GPS 115, and/or acquires a detected value of the nine-axis sensor 66 (step SB4). For example, the image acquisition unit 161 can acquire a present position of the GPS 115 and detected values of a geomagnetic sensor, an angular velocity sensor, and an acceleration sensor of the nine-axis sensor 66, and can specify the present position and posture of the head mounted display device 100.

The image acquisition unit 161 stores the captured image data obtained in step SB3 in the storage unit 120 in association with the present position and the detected values which are acquired in step SB4 (step SB5).

Thereafter, the image acquisition unit 161 determines whether conditions for terminating image capturing have been satisfied (step SB6). When the conditions for terminating image capturing have not been satisfied (step SB6; NO), the image acquisition unit returns to step SB2. Examples of the conditions for terminating image capturing include a case where an instruction for the termination of image capturing is given by an operation of the operation unit 135, a case where an operation mode of the head mounted display device 100 is converted into an operation mode in which an AR content is displayed or an operation mode in which image capturing by the right camera 61 and the left camera 62 is not performed, and the like.

The head mounted display device 100 may repeatedly perform the operations of step SB2 to step SB6 at predetermined time intervals, for example, in a state where the right camera 61 and the left camera 62 can perform image capturing. In this case, the storage unit 120 stores captured image data in association with the present position of the head mounted display device 100 and the detected value of the sensor, regardless of whether the head mounted display device 100 performs an AR display. Meanwhile, when the storage capacity of the storage unit 120 is limited, the image acquisition unit 161 may transmit the captured image data, the present position, and the detected value of the sensor, which are associated with each other, to an external device connected thereto through the communication unit 117. Examples of the external device in this case include a storage device connected to a local area network (LAN), a storage device called an online storage, a cloud storage server, and the like.

In addition, when the conditions for terminating image capturing have been satisfied (step SB6; YES), this process is terminated.

The external scenery image acquisition process of FIG. 8 uses the captured image data stored in the operation of FIG. 7, but is not required to be performed in association with or in cooperation with the operation of FIG. 7. In other words, execution timings of the operation of FIG. 7 and the operation of FIG. 8 are not restrained by each other.

The image acquisition unit 161 detects and acquires a present position of the head mounted display device 100 by the GPS 115, and acquires a detected value of the nine-axis sensor 66 (step SB11). Subsequently, the image acquisition unit 161 acquires captured image data, which is stored in association with the present position and the detected value of the sensor which are acquired in step SB11, from an external device connected thereto by the storage unit 120 or the communication unit 117 (step SB12). In step SB12, the image acquisition unit 161 retrieves captured image data using the present position and the detected value of the sensor which are acquired in step SB11 as retrieval conditions. The image acquisition unit 161 may acquire captured image data corresponding to all of the retrieval conditions, or may acquire captured image data corresponding to only some of the retrieval conditions.

The image acquisition unit 161 determines whether the number of pieces of captured image data acquired in step SB12 is two or more (step SB13). When the number of pieces of captured image data is two or more (step SB13; YES), the image acquisition unit 161 compounds the plurality of pieces of captured image data acquired into one captured image data (step SB14), and the image acquisition unit proceeds to step S13 of FIG. 5. On the other hand, when the number of pieces of captured image data acquired is one (step SB13; NO), the image acquisition unit 161 proceeds to step S13 of FIG. 5.

Figure 9:
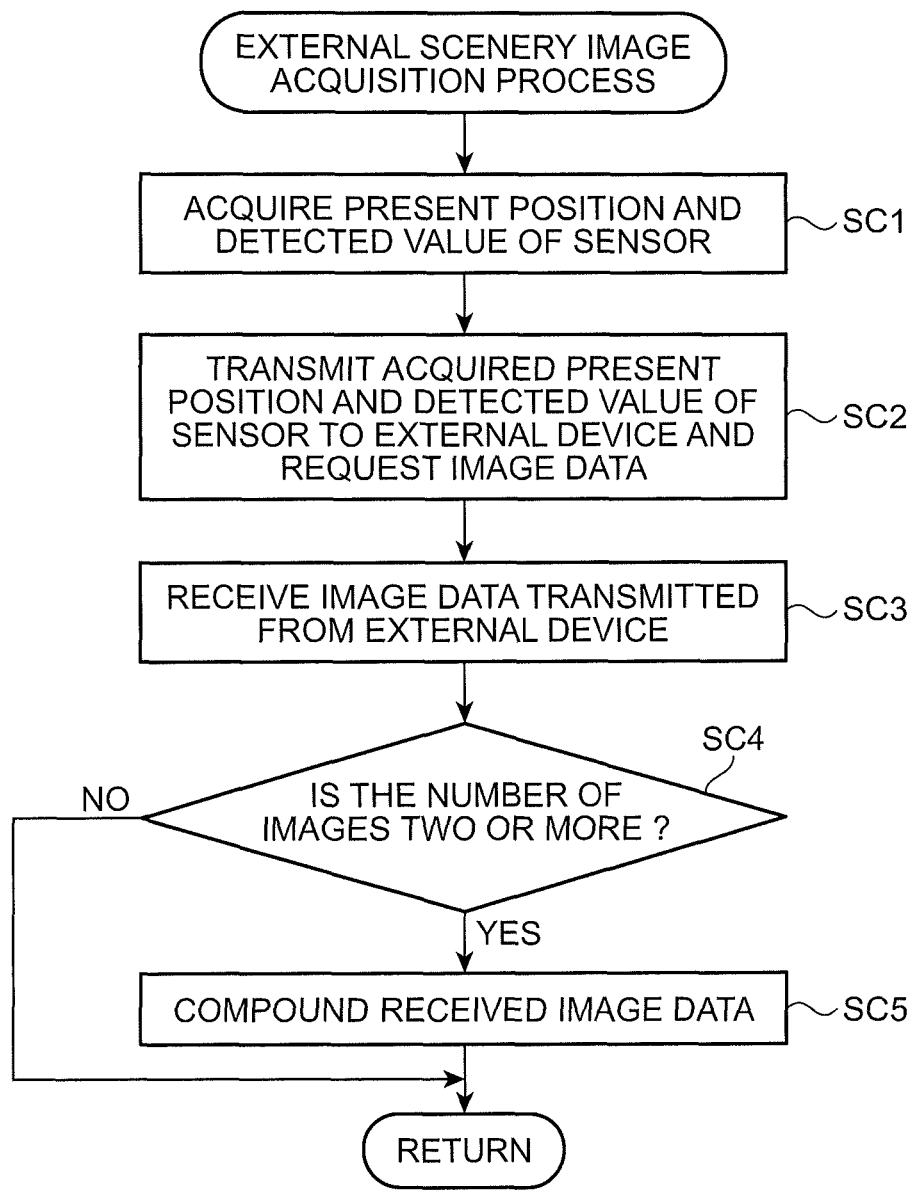
FIG. 9 is a flow chart illustrating a third mode of the external scenery image acquisition process.

FIG. 9 illustrates a third mode of the external scenery image acquisition process.

In the third mode, the image acquisition unit 161 acquires captured image data from an external device. The external device in this case is a server device or the like which is connected to the head mounted display device 100 so as to be communicated therewith, through a communication line such as a LAN which is laid in a limited range or a wide area network such as the Internet. The external device stores image data corresponding to the position of the head mounted display device 100, a detected value of a sensor, and the like.

The image acquisition unit 161 detects and acquires a present position of the head mounted display device 100 by the GPS 115, and acquires a detected value of the nine-axis sensor 66 (step SC1). Subsequently, the image acquisition unit 161 transmits the present position and the detected value of the sensor which are acquired in step SB11 to an external device connected thereto through the communication unit 117, and requests captured image data (step SC2).

Thereafter, the image acquisition unit 161 receives image data transmitted from the external device, as a response to the request transmitted in step SC3 (step SC3).

The image acquisition unit 161 determines whether the number of pieces of captured image data received in step SC3 is two or more (step SC4). When the number of pieces of captured image data is two or more (step SC4; YES), the image acquisition unit 161 compounds the plurality of pieces of captured image data received into one captured image data (step SC5), and the image acquisition unit proceeds to step S13 of FIG. 5. On the other hand, when the number of pieces of captured image data received is one (step SC4; NO), the image acquisition unit 161 proceeds to step S13 of FIG. 5.

The image acquisition unit 161 obtains one external scenery image by performing the external scenery image acquisition process of the first, second, or third mode mentioned above.

Thereafter, the position detection unit 162 recognizes an object for an AR display from the acquired external scenery image (step S13). The object for an AR display refers to a thing which is visually recognized in external scenery by a user of the head mounted display device 100, and may be any of a human, an animal, and an inanimate object. The object is not limited to a movable thing, and includes an immovable thing such as a building. The object is visually recognized through the right optical image display portion 26 and the left optical image display portion 28 when a user faces the side of the object. The head mounted display device 100 performs an AR display by displaying information regarding the object which is set in advance on the image display portion 20 so that the object is viewed at the same time.

An object to be detected is set in the position detection unit 162 in advance. The object can be set for each content for an AR display, and is included, for example, in data of a content for an AR display (hereinafter, referred to as an AR content). In addition, data regarding an object to be detected may be stored as the set data 121. In step S13, the position detection unit 162 acquires data for detecting an object from the AR content or the set data 121, and recognizes a target (object) included in an external scenery image using the data. The data for detecting a target refers to data which is used in a process of detecting an image of the object from a captured image, and a feature amount of the image of the target, and the like. For example, when a target is a physical object, feature amounts indicating the color, shape, and the other features of a captured image when an image of the physical object is captured are included in set data. In this case, the position detection unit 162 performs a process of extracting the image of the physical object from image data of an external scenery image, calculates a feature amount of the extracted image of the physical object, and compares and collates the calculated feature amount with a feature amount included in the set data 121. When the feature amounts are values close to each other or the same value, the physical object of the image extracted from the external scenery image can be recognized as a target. In addition, when a plurality of feature amounts regarding the target are included in the set data 121, the position detection unit 162 can detect the target from the external scenery image on the basis of the plurality of feature amounts and can recognize the target. When the position detection unit 162 cannot recognize the target in the external scenery image, the position detection unit stands by until the image acquisition unit 161 acquires a new external scenery image in step S12, and performs a process of recognizing an object in the new external scenery image.

In step S13, a method for the position detection unit 162 to recognize a target is not limited to a method of recognizing an image of a target on the basis of a feature amount of the image as described above. For example, a target may be selected from a physical object and the like included in the external scenery image in response to a user's instruction. In this case, the user's instruction may be an instruction based on a voice or vocal sound. Alternatively, the sound processing unit 187 converts a sound collected by the microphone 63 into text, and thus the position detection unit 162 recognizes an object and acquires information to be specified. For example, when a sound for designating features of a target in a captured image such as color and the shape of an object is converted into text, the position detection unit 162 detects an image corresponding to the designated features from the captured image and recognizes the image.

A method of inputting information regarding a target may be an operation performed on the track pad 14, or the control unit 140 may detect a gesture operation using a finger or the like. In this case, a user performs a gesture operation by moving his or her finger or the like in image capturing ranges of the right camera 61 and the left camera 62, and the control unit 140 may detect the gesture operation. Specifically, a method for a user to indicate a target and designate the target itself may be adopted. In addition, a gesture for a user to indicate a direction of a target using his or her finger or a gesture for a user to surround a range in which a target is visually recognized using his or her finger may be used.

Subsequently, for the object recognized in step S13, the position detection unit 162 calculates its position, or the position and the distance (step S14). The position detection unit 162 calculates the position and the distance using a frame of reference of the head mounted display device 100. More specifically, a relative position of the object with respect to the image display portion 20 and a distance between the image display portion 20 and the object are calculated. In this case, a central position between the right optical image display portion 26 and the left optical image display portion 28 of the image display portion 20 may be set as a reference at the time of calculating the position and the distance.

As a method for the position detection unit 162 to calculate a position, it is possible to adopt a method of obtaining coordinates of the object recognized from the external scenery image in step S13 in the external scenery image and obtaining a relative position of the object with respect to the image display portion 20 from the obtained coordinates. In this case, the position detection unit 162 can calculate a designated value of the distance between the image display portion 20 and the object from the size of the image of the object in the external scenery image. Here, data indicating a positional relationship between the external scenery image and the position of the image display portion 20 may be added to data of the external scenery image.

In addition, the position detection unit 162 may capture an image of an object by the right camera 61 and the left camera 62 to detect an image of the object in the captured image, and may calculate the position and distance of the object on the basis of the coordinates and size of the detected image in the captured image. When the image acquisition unit 161 acquires an external scenery image through the operation of FIG. 6, it is possible to perform the above-mentioned process on the basis of the external scenery image. In addition, when the image acquisition unit 161 acquires an external scenery image through the operations of FIGS. 7 and 8 or the operation of FIG. 9, the position detection unit 162 may perform the above-mentioned process by detecting an object in the external scenery image and then causing the right camera 61 and the left camera 62 to capture an image.

In addition, the position detection unit 162 may obtain a distance to an object using the distance sensor 64. When it is determined that the object detected from the external scenery image is positioned in a detection direction of the distance sensor 64, the position detection unit 162 may detect a distance by operating the distance sensor 64 and set the detected distance as the distance to the object.

The display position control unit 165 calculates a position of an object in each of display regions of the right optical image display portion 26 and the left optical image display portion 28 on the basis of the position and distance of the object which are calculated by the position detection unit 162 in step S14 (step S15). Specifically, the display regions of the right optical image display portion 26 and the left optical image display portion 28 are equivalent to the half mirrors 261A and 262A as illustrated in FIG. 3A. The display position control unit 165 calculates the position of an object of an AR content on the basis of a range of external scenery which is visually recognized by a user over the half mirrors 261A and 262A.

The display position control unit 165 determines whether the object which is calculated in step S15 is positioned within a display region of the image display portion 20 (step S16). Here, the display region refers to a range of external scenery which is visually recognized by a user over the half mirrors 261A and 262A. The object is present in the external scenery, and the display position control unit 165 determines whether the object viewed by the user overlaps the half mirrors 261A and 262A.

In step S16, the display position control unit 165 may individually perform determination on the half mirror 261A and the half mirror 262A. In this case, the display position control unit 165 individually determines whether an object is included in a range which is visually recognized by a user over the half mirror 261A and determines whether an object is included in a range which is visually recognized by the user over the half mirror 262A.

For example, when the image selection unit 163 selects a 3D AR content, it is preferable that an object is positioned within a display range in both the half mirrors 261A and 262A. In this case, when the object is positioned within the display range in both the half mirrors 261A and 262A, the display position control unit 165 determines that the object is positioned within the display region.

In addition, for example, when the image selection unit 163 selects an AR content in which a descriptive text regarding the object and text of annotation, or an image is displayed, the AR content may be displayed on either of the half mirrors 261A and 262A. In this case, when the object is positioned within the display range in either of the half mirrors 261A and 262A, the display position control unit 165 determines that the object is positioned within the display region.

In this manner, the display position control unit 165 may integrate determination results regarding the half mirrors 261A and 262A according to the type of AR content selected by the image selection unit 163 and may perform determination of step S16.

When the display position control unit 165 determines that the object is not positioned within the display region (step S16; NO), the operation processing unit 164 displays an inducement image for inducing a line of sight on the right optical image display portion 26 and the left optical image display portion 28 by controlling the display control unit 190 (step S17).

Figure 10A:
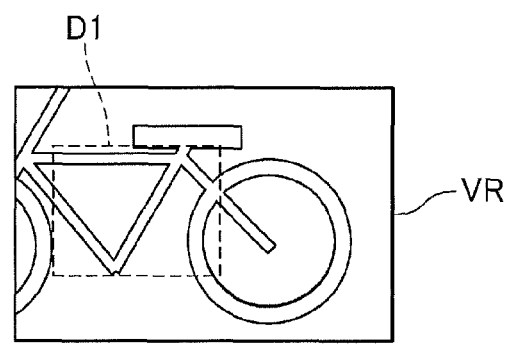
FIGS. 10A to 10C are diagrams illustrating a display example of the head mounted display device.
Figure 10B:
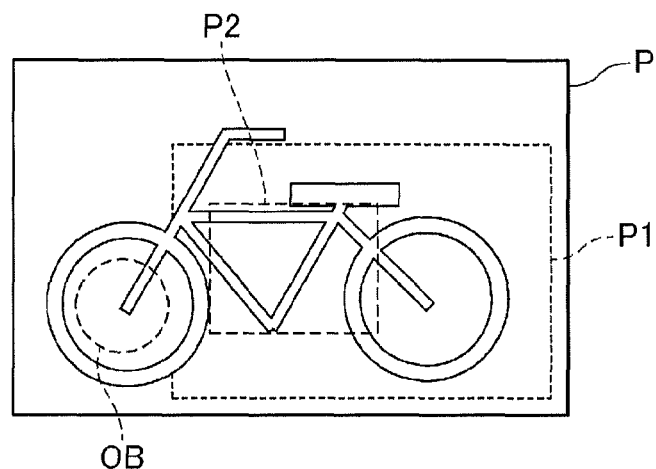
Figure 10C:
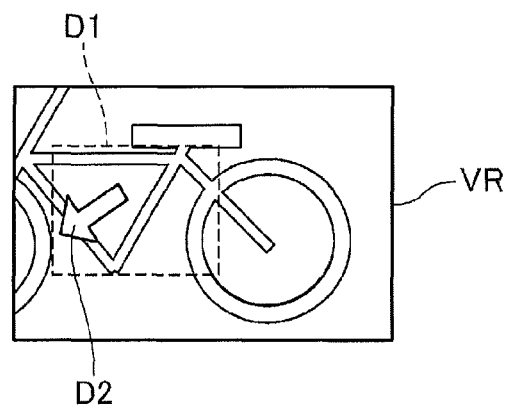

FIGS. 10A to 10C are diagrams illustrating a display example in this embodiment. FIG. 10A illustrates a field of view VR of a user, FIG. 10B illustrates an example of an external scenery image, and FIG. 10C illustrates a display example of an inducement image.

FIG. 10A illustrates an example of a field of view VR of a user's right eye. A field of view of a user's left eye is the same as or laterally symmetrical to that in FIG. 10A, and thus the illustration thereof will be omitted here. In the field of view VR, a region equivalent to the half mirror 261A serves as a display region D1, and an image drawn on the right LCD 241 (FIG. 4) is displayed in the display region D1.

Although a bicycle is viewed in the field of view VR in the example of FIG. 10A, the bicycle is an actual bicycle which is placed on the outer side of the image display portion 20. In other words, a user visually recognizes the bicycle which is external scenery through the right optical image display portion 26.

FIG. 10B illustrates an example of an external scenery image P acquired by the image acquisition unit 161. In this example, the image acquisition unit 161 acquires the external scenery image P in a range wider than a range which is visually recognized by a user, and a range larger than a range viewed in the user's field of view VR is seen in the external scenery image P. For reference, in the external scenery image P, a range seen in the field of view VR is denoted by sign P1, and a range corresponding to the display region D1 is denoted by sign P2.

In the example of FIG. 10B, an object OB corresponding to an AR content is positioned outside a range P1 seen in the field of view VR and is also positioned outside a range P2 corresponding to the display region D1. For this reason, the display position control unit 165 determines in step S16 that the object OB is not positioned within the display region. In this case, the inducement image displayed by the operation processing unit 164 in step S17 is an image for moving the user's line of sight to the object OB side, for example, as illustrated in FIG. 10C. An inducement image D2 of FIG. 10C is an arrow indicating a direction of the object OB. When the user changes the orientation of his or her head according to the arrow, there is the possibility of the object OB being positioned within the display region D1.

The operation processing unit 164 determines whether the movement of the head mounted display device 100 has been detected (step S18). The operation processing unit 164 detects changes in the orientation and position of the image display portion 20 by the nine-axis sensor 66, and determines that the movement has been detected when there is a change greater than a threshold value which is set in advance. In addition, the operation processing unit 164 may detect the movement of the head mounted display device 100 using the GPS 115. When it is determined that the movement of the head mounted display device 100 has not been detected (step S18; NO), the operation processing unit 164 continues displaying the inducement image, and performs determination of step S18 at fixed time intervals. When the movement of the head mounted display device 100 has been detected (step S18; YES), the operation processing unit 164 returns to step S14.

In addition, when the display position control unit 165 determines that the object is positioned within the display region (step S16; YES), the operation processing unit 164 controls the display control unit 190 to display the AR content on the right optical image display portion 26 and the left optical image display portion 28 (step S19). Here, the operation processing unit 164 may thin out data of the AR content and display the data on the display control unit 190. Specifically, the thinning-out of the data includes a process of reducing a frame rate by extracting a portion of a frame of moving image data, a process of reducing the resolution of the frame, and the like. Thereby, it is possible to reduce the amount of data to be processed by the display control unit 190, and thus there is an advantage in that a delay in a display timing can be prevented.

Subsequently, the display position control unit 165 performs fitting of a display position (step S20). The fitting is a function of manually adjusting the display position of the AR content by operating the control device 10 by a user. The fitting is performed when necessary such as a case where the user desires to change the position at which the AR content is displayed in step S19. Therefore, it is also possible to omit step S20, and a configuration in which it is possible to set whether to perform the fitting in step S20 may also be adopted. In step S20, the display position control unit 165 moves the display position of the AR content according to an operation of the operation unit 135, or the like. Here, the display position control unit 165 may change a display size of the AR content according to an operation of the operation unit 135, or the like. In addition, adjustment amounts of the position adjustment and the size adjustment which are performed in step S20 may be stored in the storage unit 120 as the set data 121.

A user can visually recognize the AR content at a position overlapping the object or at a position corresponding to the object by the operations of step S19 to step S20.

Thereafter, the operation processing unit 164 determines whether the operation unit 135 or the like has been operated to give an instruction for a zoom display (step S21). When the corresponding operation has been performed (step S21; YES), the operation processing unit 164 detects the user's line of sight by the line-of-sight sensor 68 (step S22). The operation processing unit 164 specifies a user's gazing direction in the display region on the basis of the detected line of sight, and performs the zoom display centering on the gazing direction (step S23), and the operation processing unit proceeds to step S24. In addition, when it is determined that an operation of giving an instruction for a zoom display has not been performed (step S21; NO), the operation processing unit 164 proceeds to step S24.

Figure 11A:
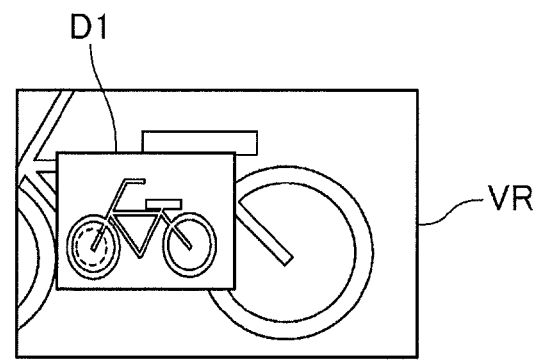
FIGS. 11A to 11C are diagrams illustrating a display example of the head mounted display device.
Figure 11B:
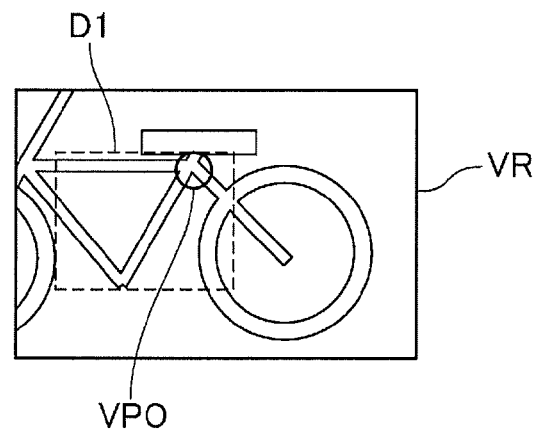
Figure 11C:
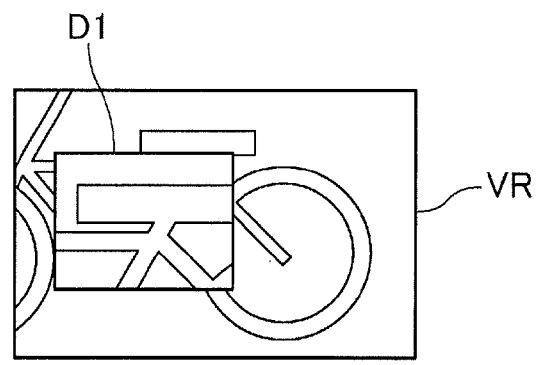

FIGS. 11A to 11C are diagrams illustrating a display example of the head mounted display device 100. FIG. 11A illustrates an example of a reduction display, FIG. 11B illustrates an example in which a gazing direction is detected, and FIG. 11C illustrates an example of a zoom display.

The reduction display illustrated in FIG. 11A is an example of an operation which is performed by the operation processing unit 164 in response to an operation of the operation unit 135, and an external scenery image P (FIG. 10B) is reduced and is displayed in a display region D1. When the reduction display is performed in a case where the external scenery image P is an image having a range wider than external scenery which is visually recognized by a user through the image display portion 20, the user can view external scenery having a range wider than a field of view VR.

In step S22, the display position control unit 165 detects a line of sight using the line-of-sight sensor 68, obtains a user's gazing direction on the basis of the detected line of sight, and calculates a gaze point at which the user gazes in external scenery overlapping the display region D1. Although a gaze point VPO is positioned within the display region D1 in FIG. 11B, the using of the line-of-sight sensor 68 can make it possible to detect the gaze point VPO even when the gaze point is positioned outside the display region D1.

In the example of FIG. 11C, a predetermined range centering on the gaze point VPO is enlarged and is displayed in the display region D1. In FIG. 11C, a portion of the external scenery image P is enlarged and displayed, but an AR image displayed in the display region D1 may be enlarged and displayed.

In step S24, the operation processing unit 164 determines whether the movement of the head mounted display device 100 has been detected (step S24). The operation processing unit 164 detects the movement of the head mounted display device 100 using the nine-axis sensor 66 and/or the GPS 115. When it is determined that the movement of the head mounted display device 100 has not been detected (step S24; NO), the operation processing unit 164 continues displaying an inducement image, and performs determination of step S21 at fixed time intervals.

When the movement of the head mounted display device 100 has been detected (step S24; YES), the operation processing unit 164 calculates the position of an object in a display region (step S25). This operation is the same as that in step S15. The display position control unit 165 determines whether the object which is calculated in step S25 is positioned within the display region of the image display portion 20 (step S26). The determination of step S26 can be performed in the same manner as that of step S16.

When the display position control unit 165 determines that the object is not positioned within the display region (step S26; NO), the control unit 140 proceeds to step S17 to display an inducement image for inducing a line of sight on the right optical image display portion 26 and the left optical image display portion 28 (step S17).

When it is determined that the object for the AR display is positioned within the display region (step S26; YES), the display position control unit 165 calculates and updates the display position of the AR display, and the operation processing unit 164 displays the AR content by controlling the display control unit 190 on the basis of the updated position (step S27).

Thereafter, the operation processing unit 164 determines whether conditions for terminating the display have been satisfied (step S28). When the conditions for terminating the display have not been satisfied (step S28; NO), the operation processing unit returns to step S21. In addition, when the conditions for terminating the display have been satisfied (step S28; YES), the operation processing unit stops displaying the AR content. Examples of the conditions for terminating the display include the presence of an instruction for the termination which is given by the operation unit 135, the completion of the display of the AR content, and the like.

Meanwhile, when the movement has been detected in step S24, the control unit 140 may be configured to update the AR display during the movement. In this case, the control unit 140 detects an object from captured images obtained by the right camera 61 and left camera 62 and specifies the position of the object to thereby obtain a display position of an AR display so as to overlap the object. Further, the control unit 140 can detect a movement speed or a movement amount of the object from the captured images, and can move the display position of the AR display according to the movement of the object. Specifically, a plurality of captured images obtained by the right camera 61 and the left camera 62 are acquired, changes in relative positions of the object in the plurality of captured images and a background, that is, a thing other than the object are detected, and the movement speed or the movement amount of the object is obtained. Thereby, it is possible to perform the AR display so as to follow the object which is moving.

Here, the control unit 140 may use a detected value of the nine-axis sensor 66 so as to be able to accurately obtain the moving speed and the movement amount of the object from the captured image even when the thing which is a background seen in the captured image has moved. When the object moves, the user can consider moving his or her head so that the object is positioned within a field of view. When relative movements of the background and the object are detected in the captured image, the control unit 140 detects the movement of the image display portion 20 from the detected value of the nine-axis sensor 66. For example, when the direction of the movement of the object with respect to the background which is detected from the captured image coincides with or approximates to the direction of the movement of the image display portion 20, the control unit 140 determines that the object is moving and adjusts the display position of the AR display. In addition, for example, when the direction of the movement of the object with respect to the background which is detected from the captured image is different from the direction of the movement of the image display portion 20, the control unit 140 determines that the background is moving. In this case, there is the possibility of a user's sense of incongruity being caused by changing the display position of the AR display, and thus the control unit 140 does not change the display position of the AR display.

In addition, the control unit 140 may generate an image to be subjected to an AR display on the basis of detection results obtained by the detection of an object from the right camera 61 and the left camera 62, but may be displayed on the basis of image data which is stored in advance in the storage unit 120 or the like. In addition, the control unit 140 may perform an AR display by cutting out a portion of a captured image obtained by the right camera 61 and/or the left camera 62. In this case, it is possible to reduce a load of a process of generating the image to be subjected to the AR display, and the like, and thus the AR display can be performed at a high speed.

As described above, the head mounted display device 100 according to the first embodiment to which the invention is applied includes the image display portion 20 that transmits external scenery and displays an image so as to be capable of being visually recognized together with the external scenery. In addition, the head mounted display device includes the control unit 140 that acquires an external scenery image including external scenery which is visually recognized through the image display portion 20, recognizes an object that is visually recognized through the image display portion 20 on the basis of the acquired external scenery image, and displays information regarding the object on the image display portion 20. Thereby, it is possible to display information regarding the object in response to the position and size of the object in the external scenery which is visually recognized by a user. Therefore, it is possible to prevent unconformity between the external scenery which is visually recognized by the user and a display image and to effectively perform a display. In addition, even when a region (display region D1) in which a virtual image can be displayed on the image display portion 20 is small, it is possible to perform a display related to an object which is present in a real space, to reduce restriction by the size of the region in which a virtual image can be displayed, and to perform an AR display with respect to a real space having a wider range.

In addition, when an object is positioned outside a range in which information is displayed on the image display portion 20, the control unit 140 performs an inducement display for inducing a line of sight to the object by the image display portion 20. Thereby, it is possible to induce the line of sight so that the object falls within the range in which the information is displayed.

In addition, the control unit 140 displays an image of external scenery in a range, which is capable of being visually recognized through the image display portion 20, on the image display portion 20 on the basis of the acquired external scenery image. Thereby, it is possible to change the appearance of the image of the external scenery which is visually recognized by a user.

In addition, the image display portion 20 is a head mounted display unit which is worn on a user's head, and includes the line-of-sight sensor 68 that detects a line of sight of the user. The control unit 140 changes a display on the image display portion 20 in accordance with the direction of the user's line of sight which is detected by the line-of-sight sensor 68. Thereby, it is possible to make a display image correspond to the user's line of sight and to more effectively prevent unconformity between the external scenery which is visually recognized by the user and the display image.

In addition, the control unit 140 displays a partial region of the external scenery image on the image display portion 20, and changes the position of the partial region displayed on the image display portion 20 in the external scenery image in association with the direction of a user's line of sight which is detected by a line-of-sight detection unit. Thereby, the external scenery image is displayed in association with the user's line of sight, and thus it is possible to prevent unconformity between the external scenery which is visually recognized by the user and the display image and to make the user visually recognize the external scenery image.

In addition, the head mounted display device 100 includes the right camera 61 and the left camera 62 that capture an image of a range including external scenery which is visually recognized through the image display portion 20. As described in the first mode, the control unit 140 may acquire captured images obtained by the right camera 61 and the left camera 62 as external scenery images. In this case, it is possible to acquire an external scenery image corresponding to external scenery which is visually recognized by a user without preparing the external scenery image in advance and to display the image.

In addition, the control unit 140 may acquire and compound a plurality of captured images obtained by the right camera 61 and the left camera 62 which are a plurality of image capturing units to thereby generate an external scenery image. In this case, it is possible to obtain the external scenery image having a preferable size and angle of view by using the plurality of captured images.

In addition, as described in the second mode, the control unit 140 may acquire and compound a plurality of captured images obtained by the right camera 61 and the left camera 62 to thereby generate an external scenery image. In this case, it is possible to obtain an external scenery image having a preferable size and angle of view without being restricted by angles of view of the right camera 61 and the left camera 62, and the like.

In addition, the head mounted display device 100 includes the communication unit 117 which is connected to an external device, and the control unit 140 may acquire an external scenery image from the external device connected to the communication unit 117 as described in the third mode. In this case, it is possible to acquire the external scenery image without storing the external scenery image in advance or providing a unit performing image capturing.

In addition, the head mounted display device 100 includes the GPS 115 that detects a present position, and the control unit 140 may acquire an external scenery image corresponding to the present position detected by the GPS 115 from an external device through the communication unit 117. In this case, it is possible to acquire an external scenery image corresponding to the position of the head mounted display device 100.

In addition, the head mounted display device 100, which is a display device worn on a user's head, includes the image display portion 20 including the half mirrors 261A and 262A as display regions which transmits external scenery and displays an image so as to be capable of being visually recognized together with the external scenery. The control unit 140 included in the head mounted display device 100 recognizes an object which is positioned outside a range in which the object is capable of being visually recognized through the half mirrors 261A and 262A, and outputs information regarding the object.

For example, when an object is visually recognized through the outer sides of the half mirrors 261A and 262A in the image display portion 20, the control unit 140 outputs information for inducing a user to be in a state where the object can be visually recognized. The information output by the control unit 140 is, for example, an inducement image D2 indicating a direction in which an object for an AR display is positioned. In this case, a method for the control unit 140 to output the information is a method of displaying the inducement image D2 on the image display portion 20, but the position of an object may be indicated by text to induce a user. In addition, a sound for inducing a user may be output from the right earphone 32 and/or the left earphone 34.

Second Embodiment

Figure 12:
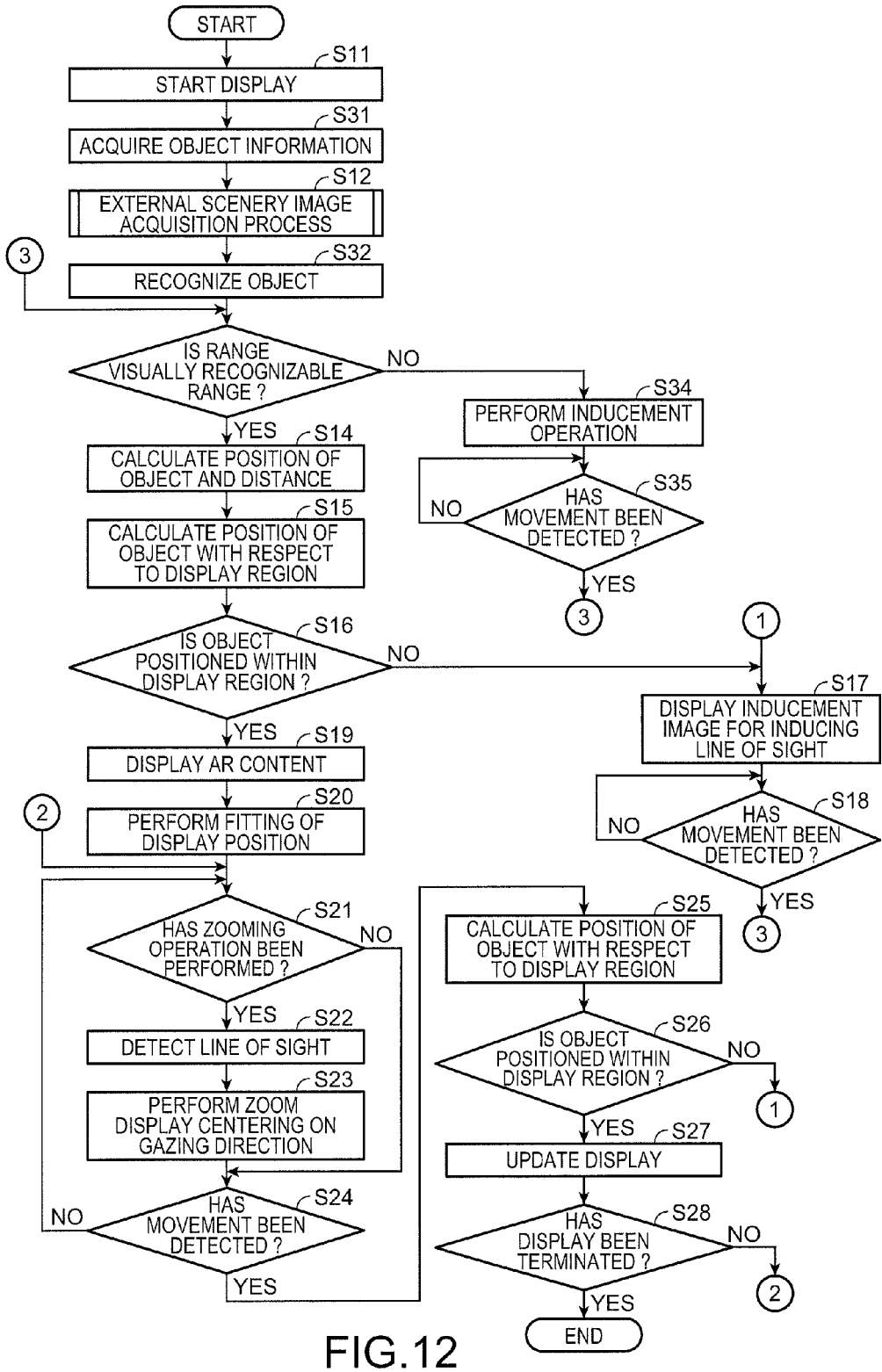
FIG. 12 is a flow chart illustrating an operation of a head mounted display device according to a second embodiment.

FIG. 12 is a flow chart illustrating an operation of a head mounted display device 100 according to a second embodiment.

A configuration of the head mounted display device 100 of the second embodiment is common to the configuration described with reference to FIGS. 1 to 4 in the above-described first embodiment, and thus a description and illustration thereof will be omitted here.

In the second embodiment, when an object of an AR content is positioned outside a range in which the object is capable of being visually recognized through an image display portion 20, the head mounted display device 100 outputs guidance for a user so as to set a state where the object can be visually recognized.

When a user wears the head mounted display device 100 and an instruction for displaying an AR content is given by an operation of an operation unit 135, a control unit 140 starts an operation related to the display (step S11).

The control unit 140 acquires object information regarding the position of the object to be subjected to the display of the AR content (step S31). The object information includes data for obtaining relative positions of the head mounted display device 100 and the object. Specifically, the object information may include data indicating relative positions of the head mounted display device 100 and the object, or may include data indicating relative positions of a predetermined target and the object.

For example, the object information may include data capable of specifying the position of the object by a position detection system using a GPS or WiFi. In this case, the control unit 140 can detect the position of the image display portion 20 using a GPS 115 or a communication unit 117, and can specify relative positions of the image display portion 20 and the object on the basis of the detected position of the image display portion 20 and the object information.

In addition, an object for an AR display is not limited to the entire thing or the entire physical object, and a specific portion or surface in the thing may be set as an object.

In this case, data for specifying the position of an object with respect to the position of the thing including the object may be included in object information. For example, data for specifying the entire thing, such as CAD data of the thing including the object and a diagram illustrating an exterior of the entire thing, and data for specifying the position of the object in the entire thing can be included in the object information.

The control unit 140 performs an external scenery image acquisition process by an image acquisition unit 161 (step S12). The external scenery image acquisition process can be performed in the first to third modes described above.

The control unit 140 recognizes an object for an AR display from the external scenery image acquired in step S12 and the object information acquired in step S31 by a position detection unit 162 (step S32). As described above, the object for an AR display is a thing in a real space which is visually recognized by a user at the time of displaying an AR content. In step S32, the position detection unit 162 recognizes the object in the external scenery image acquired in step S12 as described with reference to step S13 (FIG. 5). In addition, when the object is not included in the external scenery image, the position detection unit 162 specifies the position of the object (relative positions of the head mounted display device 100 and the object) using the object information acquired in step S31.

When the object information includes data indicating relative positions of a target and an object, the position detection unit 162 detects the target from an external scenery image, and obtains relative positions of the detected target and the head mounted display device 100. The position detection unit 162 obtains the position of the object with respect to the head mounted display device 100 on the basis of the obtained relative position and the data included in the object information. In a process of detecting the target from the external scenery image, data used in a process of detecting an image of a target from a captured image is used, and the data includes, for example, feature amounts indicating the color, shape, and the other features of a captured image when an image of the target is captured. The data is included in, for example, the object information. The position detection unit 162 performs a process of extracting an image of a thing from image data of an external scenery image, calculates a feature amount of the extracted image of the thing, and compares and collates the calculated feature amount with a feature amount included in the object information. When the feature amounts are values close to each other or the same value, the position detection unit 162 recognizes the image extracted from the external scenery image as the image of the target.

In addition, when the object information acquired in step S31 includes data indicating relative positions of the object and the head mounted display device 100, the position detection unit 162 may specify the position of the object without using the external scenery image. This process may be performed when the position detection unit 162 cannot detect either of the object and the target from the external scenery image.

The position detection unit 162 determines whether the position of the object recognized in step S32 is a position which is capable of being visually recognized by a user (step S33). The user wearing the image display portion 20 visually recognizes external scenery (real space) through the image display portion 20, and thus the position detection unit 162 determines whether an object is present in a range which is visually recognized by the user through the image display portion 20.

Here, when an object is present in a range which is capable of being visually recognized by the user (step S33; YES), the position detection unit 162 proceeds to step S14. The subsequent operations are as described in the above-mentioned first embodiment.

On the other hand, when an object is not present in a range which is capable of being visually recognized by the user (step S33; NO), an operation processing unit 164 performs an inducement operation of inducing the user (step S34).

When the control unit 140 proceeds to step S34, an object is not present in a range which is capable of being visually recognized by a user through the image display portion 20, that is, a field of view of the user. For this reason, in order for the user to view the object, the user needs to move (move forward or backward) or change the orientation of his or her head. The control unit 140 guides or gives notice of an operation to be performed by the user in order for the object to be positioned within a field of view of the user, by the inducement operation of step S34. In other words, the inducement operation is an operation of the head mounted display device 100 for inducing the user to be in a state where the object can be visually recognized. Specifically, the inducement operation includes a display of an image, a display of text, and an output of a sound, and may be performed by combining these displays.

Figure 13A:
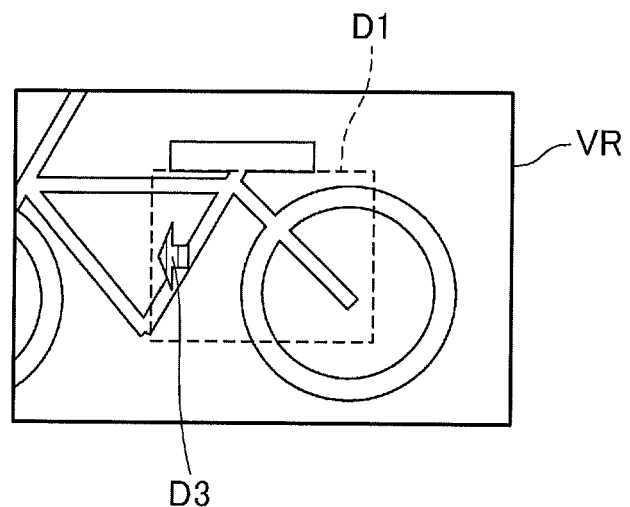
FIGS. 13A and 13B are diagrams illustrating a specific example of an inducement operation of the head mounted display device.
Figure 13B:
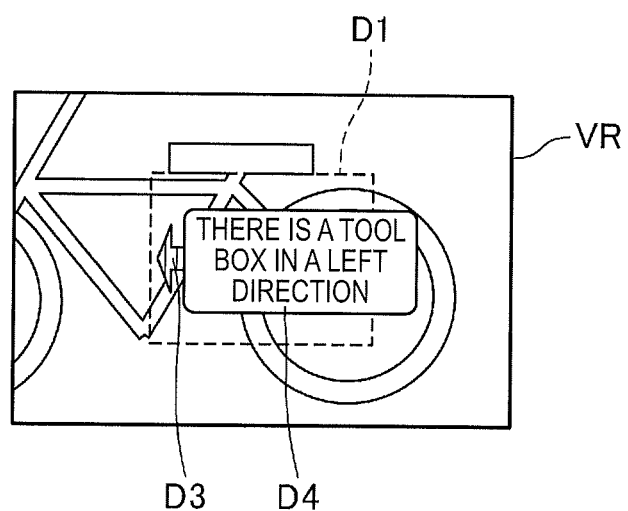

FIGS. 13A and 13B are diagrams illustrating a specific example of an inducement operation. FIG. 13A illustrates an example of an inducement operation using an image, and FIG. 13B illustrates an example of an inducement operation using an image and text.

In the example of FIG. 13A, an inducement display D3 is displayed in a display region D1 in a field of view VR of a user. The display region D1 is a region in which a virtual image can be visually recognized by the user's eyes using half mirrors 261A and 262A as described above.

The inducement display D3 illustrated in FIG. 13A indicates a specific direction by an arrow. For example, the direction indicated by the inducement display D3 is (1) a direction in which an object is positioned, (2) a direction in which a user should be moved in order to set a state where the object can be visually recognized, or (3) a direction in which a user should turn the orientation of his or her face (head) in order to set a state where the object can be visually recognized. The meaning or object of the direction (for example, (1) to (3) mentioned above) which is indicated by the inducement display D3 is referred to as an attribute of an inducement image.

The attribute of the inducement display D3 may be any of (1) to (3) mentioned above or may be set in advance, or may be distinguished by a display mode of the inducement display D3.

For example, the control unit 140 may be configured to be capable of switching between display modes of the inducement display D3. Specifically, the control unit may switch between a display of lighting the inducement display D3 on and off and a display of not lighting the inducement display on and off, may select display colors of the inducement display D3 from a plurality of colors and switch between the display colors, or may select display sizes of the inducement display D3 from a plurality of stages of display sizes.

In this case, the control unit 140 can select a display mode of the inducement display D3 in response to the attribute of the inducement display D3. For example, the display mode is set in association with individual attributes of the inducement display D3, and the control unit 140 may determine a display mode of the inducement display D3 according to the setting.

FIG. 13B illustrates an example in which the control unit 140 displays an inducement display D4 including text in addition to the inducement display D3. The inducement display D4 is displayed in the display region D1 together with the inducement display D3, and provides information by text. Contents of the inducement display D4 are arbitrary, but may be contents related to information provided by the inducement display D3. For example, additional information regarding the direction indicated by the inducement display D3 may be provided by the inducement display D4. In addition, contents of the information of the inducement display D4 may be the same as those of the information of the inducement display D3, or may be explanation of the information of the inducement display D3. In addition, the contents of the inducement display D4 may be information capable of being understood without viewing the inducement display D3.

The inducement display D4 may be contents for promoting a user to move. For example, text such as "Please proceed forward one step" or "Please proceed forward 50 cm, and come close to a bicycle which is an object" can be set. In addition, text for promoting movement and text for explaining the purpose of movement or an operation after movement may be included. For example, text such as "Please proceed forward 50 cm, and come close to a bicycle which is an object. A tool that is subjected to an AR display overlaps a screw of the bicycle" can be set. In addition, the inducement display may be contents for promoting a user's operation using the arrow which is the inducement display D3. For example, text such as "There is a tool box in a direction of a yellow arrow on the left. Please take out a spanner from the tool box" can be set. The control unit 140 can induce an object for an AR display so as to overlap the display region D1 with respect to a user, by the inducement displays D3 and D4 illustrated in FIGS. 13A and 13B, and the like. In addition, the control unit 140 may induce the object for an AR display so as to overlap the center of the display region D1.

In addition, the control unit 140 may change a display mode of the display for inducing the inducement displays D3 and D4 and the like in accordance with relative positions of the display region D1 and the object for an AR display. That is, the display mode may be changed in accordance with relative positions of a real space which is visually recognized by a user through the display region D1 and an object. Specifically, a distance between the real space which is visually recognized by the user through the display region D1 and the object may be divided into a plurality of stages, the display size of the inducement display D3 or the inducement display D4 may increase as the distance becomes longer, and the display size may decrease as the distance becomes shorter. In addition, when the distance is long, the display position of the inducement display D3 or the inducement display D4 may be set to be a position close to the center of the display region D1. As the distance becomes shorter, and the display position may be moved to a side on which the object for an AR display is positioned.

In addition, the control unit 140 is not limited to the inducement displays D3 and D4, and may perform combination with inducement using a sound. Contents for transmitting information regarding inducement or guidance to a user can be set by a language which is set with respect to the control device 10 in advance by the user.

Specific contents provided using a sound can be the same as, for example, the contents of the inducement display D4. In addition, instructions for a standing position, a line of sight, the orientation of a head, a position of a hand, how to hold, and the like may be output to a user using an inducement display including text and a sound. For example, when guidance of a work procedure is performed according to a work scenario by an AR display, information for guiding a work state may be provided by a sound or a display of text. The scenario is data which includes at least any one of an image, text, and a sound and in which a display order is set in the image and/or the text and an output timing of the sound is set in association with the display order of the image and/or the text. When the number of objects (image, text, sound, and the like) to be output is two or more, the objects may be switched and output. An output timing and a switching timing of the object may be set in association with the elapse of time since the start of the reproduction of the scenario, or an input to the control device 10 may be set as a trigger. In addition, the control unit 140 may analyze captured images obtained by a right camera 61 and a left camera 62 to thereby detect a trigger.

In this case, a feature amount of the image which is detected as a trigger, and the like are included in the scenario. An image or text for inducement such as the inducement display D3 or D4, or a sound which is output by the control unit 140 can also be included in a portion of the scenario. In addition, data such as a feature amount of an object for an AR display can also be included in data of the scenario.

The control unit 140 may output text for inducement such as the inducement display D3 or D4 or a sound in accordance with the position of the object which is recognized in step S32, together with the text or sound of the scenario.

The control unit 140 may generate text which is output like the inducement display D4 or contents of a sound to be output, every time, on the basis of the object information acquired in step S31 and the recognition results in step S32. In addition, the control unit 140 may select text from text included in data which is stored in advance in the storage unit 120 or the like or data acquired from an external device OA and may display the selected text, or may convert the selected text into a sound and may output the sound.

The inducement display D3, the inducement display D4, the AR display, or the like which is displayed in the inducement display by the control unit 140 may be displayed using image data stored in advance in the storage unit 120 or the like. In this case, for example, when relative positions of an object and a user change greatly in a short period of time, it is possible to promptly perform a display. In addition, the control unit 140 may cut out a portion of captured images obtained by the right camera 61 and the left camera 62 to perform an AR display.

In addition, the control unit 140 may be configured to be able to switch between display modes of the inducement display D4. For example, the control unit may switch between a display of lighting the inducement display D4 on and off and a display of not lighting the inducement display, may select a display color of the inducement display D4 from a plurality of colors and switch between the display colors, or may select a font and a character size of the inducement display D4 from a plurality of fonts and character sizes.

The control unit 140 may switch between display modes of the inducement displays D3 and D4 in accordance with attributes of the inducement display D3 and contents of the inducement display D4 as described above. In addition, when the attributes of the inducement display D3 are clear by the contents of the inducement display D4, the control unit 140 may not adjust a display mode corresponding to the attributes of the inducement display D3.

Contents of an inducement operation performed by the control unit 140 are not limited to the examples illustrated in FIGS. 13A and 13B. For example, a marker for notification may be displayed in a peripheral edge portion of the display region D1. The marker may be an arrow like the inducement display D3, may be a geometric figure such as a circle or a polygon, or may be an illustration or the like. Although the marker may be accompanied by text, it is preferable that the marker is displayed without text so as to be intuitively recognized by a user.

Figure 14:
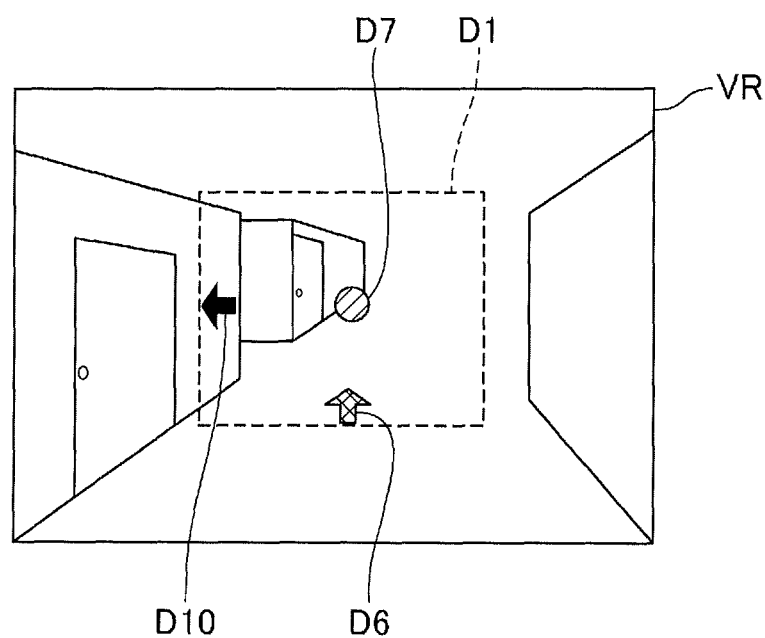
FIG. 14 is a diagram illustrating a specific example of an inducement operation of the head mounted display device.

FIG. 14 illustrates an example of an inducement operation using a marker as another specific example of an inducement operation of the head mounted display device 100.

In the example of FIG. 14, markers D6 and D10 are displayed in a peripheral edge portion of a display region D1 in a user's field of view VR. In this example, the control unit 140 displays attention information for promoting attention to a user, precaution information for promoting particularly strong attention or precaution for matters related to safety, and work information regarding work according to a scenario.

For example, the marker D10 is a marker indicating precaution information regarding a left direction in the drawing, and is displayed in a color (for example, red) which is set as a display color of precaution information. The control unit 140 may convert text such as "Please do not come close in a left direction any more. You may run into a wall" into a sound and may output the sound from a right earphone 32 and a left earphone 34 in synchronization with a timing when the display of the marker D10 is started. In addition, the marker D6 is displayed in a color (for example, yellow) which is set as a display color of attention information. The control unit 140 may convert text such as "You can see a progress guidance arrow on the left front side. Please do not go past" into a sound and may output the sound from the right earphone 32 and the left earphone 34 in synchronization with a timing when the display of the marker D6 is started.

In addition, a marker D7 indicates a position of an object for an AR display, and is displayed in a color (for example, green) which is set as a display color of work information. The control unit 140 may convert text such as "Please proceed forward 30 m in a left front direction. You can see a load which is an object. The object is a green marker." into a sound and may output the sound from the right earphone 32 and left earphone 34 in synchronization with a timing when the display of the marker D6 is started. Here, when the object can be visually recognized through the display region D1, the control unit 140 performs an AR display on the display region D1. The control unit 140 displays a marker D7 in a case where a distance between the head mounted display device 100 and the object is longer than a distance which is set and a case where it is not possible to detect the object from a captured image because the object cannot be directly visually recognized due to a wall or an obstacle. Thereby, it is possible to notify a user of an object which is not capable of being visually recognized directly or is not likely to be visually recognized directly because the object is located at a position overlapping the display region D1.

Markers such as the markers D6 and D10 which have a direction are stored in advance as images having an indicating direction specified therein or an AR object. That is, when the control unit 140 displays markers having an indicating direction specified therein, the control unit reads and displays images of the markers corresponding to the direction in which the display is performed. These images can be referred to as AR display objects having a vector. A direction may be associated with not only the image of the arrow illustrated in the drawing but also a character (text). In this case, there is an advantage in that the control unit 140 can promptly perform an AR display, compared to a case where an image of a marker or a character is generated.

Further, the head mounted display device 100 may be configured such that a marker displayed in the display region D1 can be used as an operation object that receives a user's input.

Figure 15A:
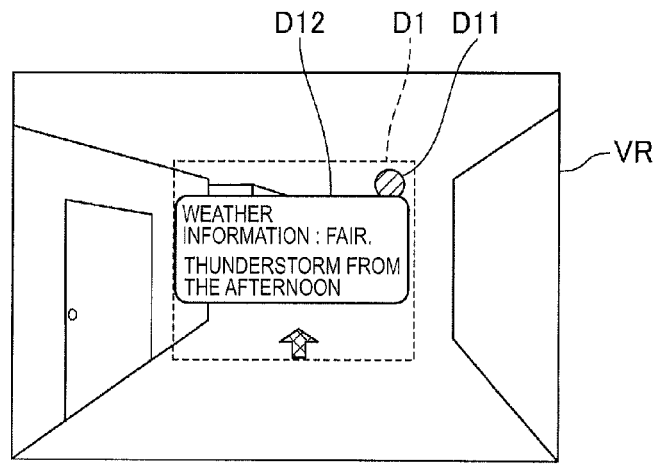
FIGS. 15A to 15C are diagrams illustrating a specific example of an inducement operation of the head mounted display device.
Figure 15B:
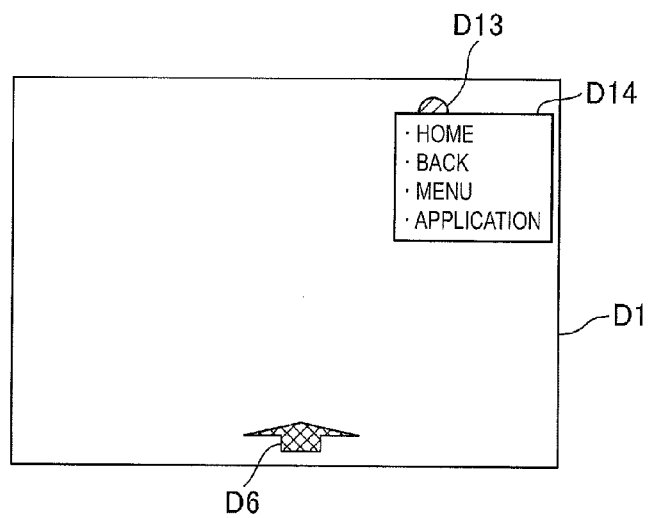
Figure 15C:
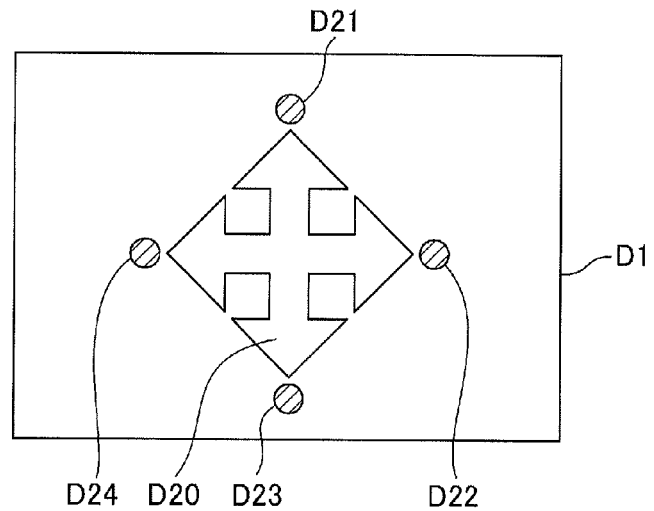

FIGS. 15A to 15C are diagrams illustrating other specific examples of an inducement operation of the head mounted display device 100. FIG. 15A illustrates an example in which a marker is set as an operation object, FIG. 15B illustrates an operation example for a marker, and FIG. 15C illustrates another example of an operation for a marker.

In FIG. 15A, a marker D11 is displayed in a display region D1. When the control unit 140 detects an operation for the marker D11, the control unit displays and outputs, for example, text information D12. The text information D12 is a weather forecast, and the control unit 140 acquires the information by the communication unit 117 or the like.

In FIG. 15B, a marker D6 and a marker D13 are displayed in the display region D1. The marker D6 is displayed as, for example, attention information as described in FIG. 14. On the other hand, the marker D13 is an object for an operation. When the marker D13 is operated, for example, a pulldown menu D14 is displayed.

For example, an operation of selecting the marker D13 is performed by making a user utter a sound for an instruction and making the control unit 140 detect the sound from sounds collected by a microphone 63. In addition, a configuration may be adopted in which a marker can be selected by making a user move his or her head. The control unit 140 detects the movement of a head of a user wearing the image display portion 20 by a nine-axis sensor 66, and selects a marker displayed at a position corresponding to the detected movement. In the example of FIG. 15B, a user performs an operation of moving his or her head in an upper right direction, and thus the marker D13 displayed on the upper right side of the display region D1 is selected. In addition, an operation of selecting one item from items (four times in the example of FIG. 15B) which are displayed in the pulldown menu D14 can also be performed by a sound or the movement of the head. In addition, when the head mounted display device 100 includes a sensor that detects the movement of a user's body, not only the movement of the head but also the movement of the user's body may be detected as an operation.

A marker such as the marker D13 which is an operation object can be displayed at the same time as a marker indicating precaution information, attention information, or work information, and is displayed at the same time as, for example, the marker D6 in the example of FIG. 15B. In this case, it is preferable that a display color of the marker which is an operation object is set to be a display color different from that of the marker indicating precaution information, attention information, or work information. In this case, a user can easily distinguish between the marker indicating precaution information, attention information, or work information and the marker which is an operation object by the colors of the markers.

In addition, the control unit 140 may be configured to display a plurality of markers which are search objects in the display region D1. In this case, a user can select one marker among the plurality of markers displayed, using a sound. As a selection method using a sound, a word for designating attributes of a marker such as the color, shape, and position of the marker may be uttered. For this reason, it is preferable that the plurality of markers simultaneously displayed in the display region D1 have different attributes. For example, when a user utters a word for designating the color of a marker in a state where markers having different display colors such as red, blue, and yellow are displayed, a marker corresponding to the uttered word is selected.

Further, FIG. 15C illustrates an example in which a direction instruction operation is performed using a plurality of markers D21, D22, D23, and D24. In the example of FIG. 15C, a key image D20 corresponding to instructions for horizontal and vertical directions is displayed, and the markers D21, D22, D23, and D24 are disposed at positions corresponding to the instruction directions. The markers D21, D22, D23, and D24 have visually distinguishable attributes, and have different display colors such as, for example, red, blue, and yellow.

When a user utters a word (for example, a word such as red, blue, or yellow for designating a display color) for designating an attribute of a marker using a sound, the control unit 140 selects the corresponding marker from the markers D21, D22, D23, and D24. The control unit 140 determines that an operation of giving an instruction for a direction has been performed in a direction corresponding to the selected marker.

In other words, it is possible to give an instruction for a direction corresponding to the selected marker by selecting any of the markers D21, D22, D23, and D24. Thereby, it is possible to perform an operation using a sound in a hands-free manner so as to substantially operate hardware which is a cross key such as the key image D20.

For example, when an instruction for a specific direction (for example, right direction) is given by the key image D20, the control unit 140 converts a display mode of an AR display into a display for close position work. The image display portion 20 is configured to form a virtual image on user's eyes by the half mirrors 261A and 262A capable of transmitting external scenery. For this reason, the size of an object displayed in the display region D1 is viewed by a user wearing the image display portion 20 as a size according to a distance to external scenery which is visually recognized through the image display portion 20 by human visual characteristics.

The head mounted display device 100 performs a display in accordance with a case where a user gazes at a position separated from the image display portion 20 at a distance of 4 m in a real space by default (initial) setting.

Specifically, the control unit 140 sets a display position of an AR image (including an object such as a marker) in the display region D1 to be a position according to a convergence angle between user's both eyes in a case where the user gives attention to a position of 4 m ahead of the user. The convergence angle refers to an angle between a straight line connecting a right eye RE and an object OB and a straight line connecting a left eye LE and the object OB in a case of giving attention to the object OB illustrated in FIG. 3B. The size of the convergence angle changes according to a distance at which the user gazes (distance to the object OB). When the distance at which the user gazes is shorter than 4 m, the convergence angle between the user's both eyes becomes larger than a convergence angle which is assumed by default setting. In this case, the control unit 140 shifts a display position of an image in the half mirrors 261A and 262A to a side close to the center of the image display portion 20, that is, a nose side. In addition, when the distance at which the user gazes is longer than 4 m, the convergence angle between the user's both eyes becomes smaller than the convergence angle which is assumed by default setting. In this case, the control unit 140 shifts a display position of an image in the half mirrors 261A and 262A to a position close to the end of the image display portion 20, that is, an ear side. An operation of the key image D20 in FIG. 15C can be made to correspond to the adjustment of the convergence angle. When an instruction is given in a specific direction of the key image D20, the control unit 140 shifts a display position in the display region D1 to the nose side so that the convergence angle becomes larger. Thereby, it is possible to perform a display suitable for a case where a user performs work while paying attention to a close position such as his or her hand. In addition, an instruction for an opposite side to the specific direction mentioned above is given in the key image D20, the control unit 140 shifts the display position in the display region D1 to the ear side so that the convergence angle becomes smaller. Thereby, it is possible to perform a display suitable for a case where a user performs work while paying attention to a distant place. In this example, the user can adjust a display position suitable for a distance to a work object by a hands-free operation.

Third Embodiment

Figure 16:
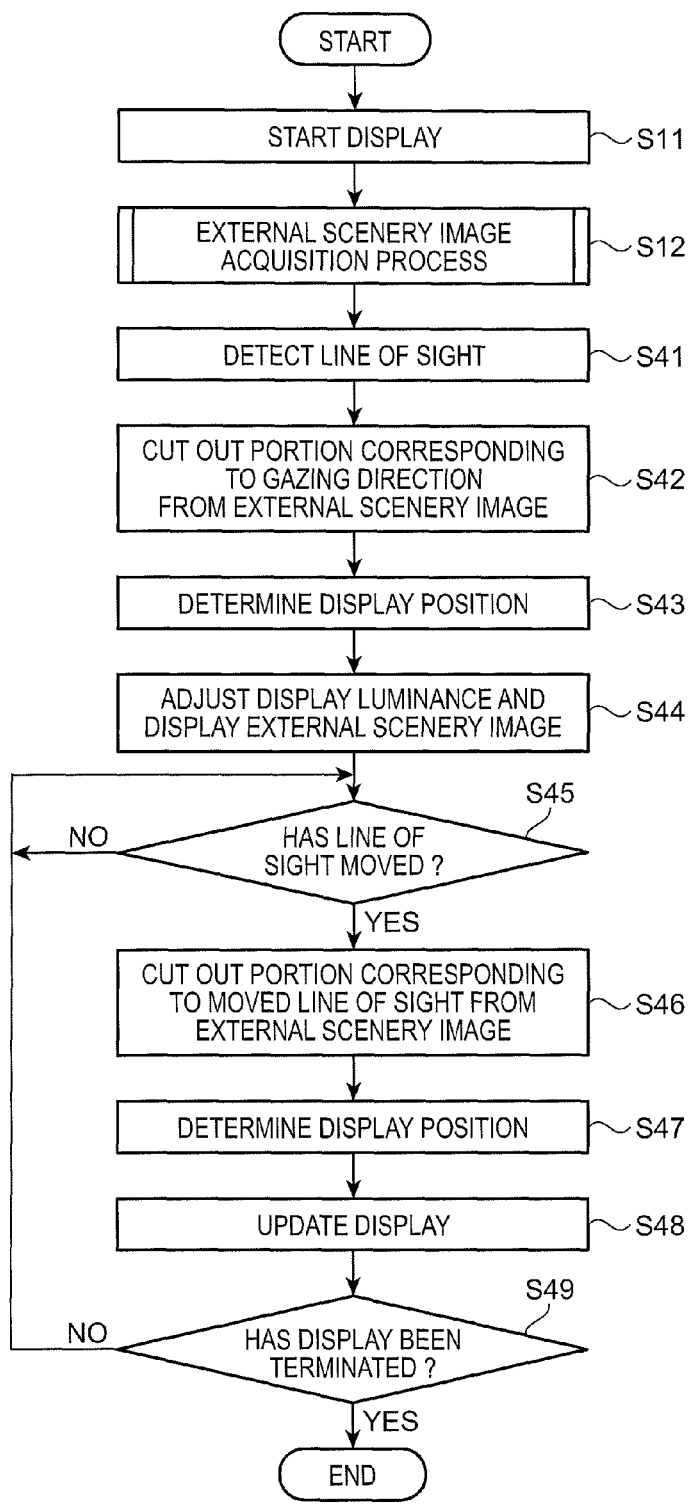
FIG. 16 is a flow chart illustrating an operation of a head mounted display device according to a third embodiment.

FIG. 16 is a flow chart illustrating an operation of a head mounted display device 100 according to a third embodiment.

A configuration of the head mounted display device 100 of the third embodiment is common to the configuration described with reference to FIGS. 1 to 4 in the above-described first embodiment, and thus a description and illustration thereof will be omitted here.

In the third embodiment, the head mounted display device 100 detects the movement of a user's line of sight during the display of an AR content and changes a display position in accordance with the movement of the line of sight.

When a user wears the head mounted display device 100 and an instruction for the display of an AR content is given by an operation of an operation unit 135, a control unit 140 starts an operation related to the display (step S11).

The control unit 140 performs an external scenery image acquisition process by an image acquisition unit 161 (step S12). The external scenery image acquisition process can be performed in the first to third modes described above.

After the image acquisition unit 161 acquires an external scenery image through the external scenery image acquisition process, the operation processing unit 164 detects a user's line of sight by a line-of-sight sensor 68 (step S41). The operation processing unit 164 specifies a user's gazing direction in a display region on the basis of the detected line of sight, and performs a process of cutting out a portion corresponding to the gazing direction from the external scenery image (step S42).

In step S41, the operation processing unit 164 detects a user's line of sight using a line-of-sight sensor 68, and specifies a user's gazing direction by setting an image display portion 20 as a reference. The reference in this case can be set to be a central position between a right optical image display portion 26 and a left optical image display portion 28 of the image display portion 20, the center between half mirrors 261A and 262A, or the like.

In step S42, the operation processing unit 164 specifies correspondence between the external scenery image acquired in step S12 by the image acquisition unit 161 and real external scenery which is visually recognized by a user through the image display portion 20. The external scenery image acquired by the image acquisition unit 161 includes real external scenery which is visually recognized by the user, and additionally includes an image of external scenery in a range which is not able to be visually recognized by the user. When the external scenery image acquisition process of step S12 is performed in the first mode (FIG. 6) or the second mode (FIG. 7, FIG. 8), the operation processing unit 164 obtains relative positions of external scenery which is visually recognized by the user and the external scenery image on the basis of angles of view of a right camera 61 and a left camera 62. In addition, when the external scenery image acquisition process is performed in the third mode (FIG. 9), the operation processing unit 164 obtains relative positions of the external scenery which is visually recognized by the user and the external scenery image on the basis of the position and direction of the image display portion 20 which are detected at the time of receiving the external scenery image from an external device. The operation processing unit 164 specifies a position overlapping the direction of the user's line of sight in the external scenery image, that is, a gaze point on the basis of the relative positions.

Figure 17A:
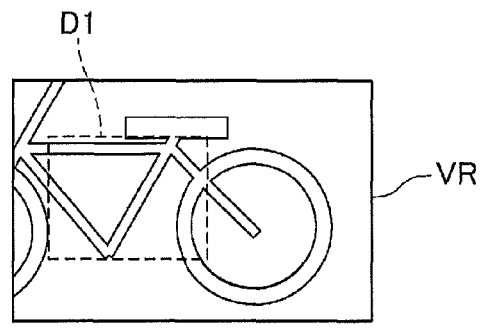
FIGS. 17A to 17C are diagrams illustrating a display example of the head mounted display device.
Figure 17B:
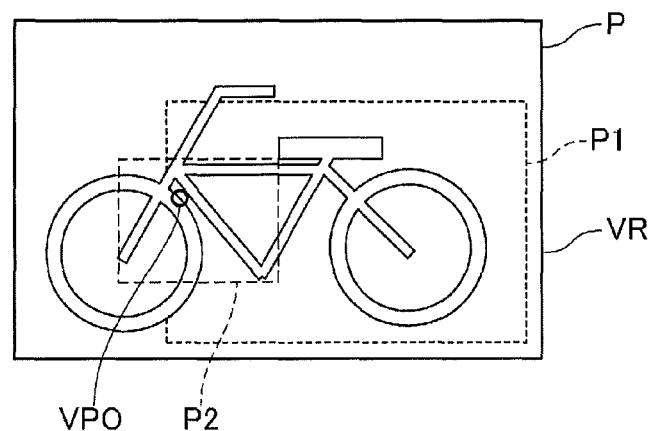
Figure 17C:
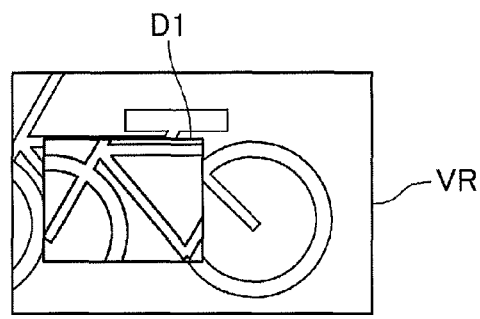

FIGS. 17A to 17C are diagrams illustrating a display example according to the third embodiment. FIG. 17A illustrates a user's field of view VR, FIG. 17B illustrates an example of an external scenery image, and FIG. 17C illustrates a display example corresponding to a line-of-sight direction.

FIGS. 17A to 17C illustrate an example of a field of view VR of a user's right eye. A field of view of a user's left eye is the same as or laterally symmetrical to those in FIGS. 17A and 17C, and thus a description thereof will be omitted here. A region equivalent to the half mirror 261A in the field of view VR is indicated by a display region D1.

In the example of FIG. 17A, a bicycle is seen in the field of view VR, but the bicycle is a real bicycle which is placed on the outer side of the image display portion 20. In other words, a user visually recognizes the bicycle which is external scenery through the right optical image display portion 26.

As illustrated in FIG. 17B, the operation processing unit 164 specifies a position in the external scenery image corresponding to the direction of the user's line of sight, and sets the position as a gaze point VPO. Further, the operation processing unit 164 performs a process of cutting out a rectangular portion P2 centering on the gaze point VPO from the external scenery image. The size of the portion P2 is set in advance in accordance with display resolutions of a right LCD 241 and a left LCD 242, and the like.

A display position control unit 165 determines a display position and a size with respect to the image having been subjected to the cut-out process by the operation processing unit 164 in step S42 (step S43). Subsequently, the operation processing unit 164 adjusts display luminance and displays the external scenery image having been subjected to the cut-out process in step S42 in accordance with the position and the size which are determined in step S43 (step S44).

A display example of the external scenery image is illustrated in FIG. 17C. In the field of view VR, an image centering on the gaze point VPO is displayed at the position of the half mirror 261A. A display image on the half mirror 261A is displayed such that a display position of a portion of external scenery is shifted, and thus a user can visually recognize external scenery at a position that the user desires to see, with the external scenery shifted to an easily viewable position.

When the display luminance is adjusted, it is possible to adjust visibility of the image which is cut out from the external scenery image and real external scenery. As the amount of image light incident on user's eyes by the half mirrors 261A and 262A increases, the amount of external light passing through the half mirrors 261A and 262A becomes relatively smaller, and thus real external scenery is not likely to be seen. In other words, when the luminance of a display image on the image display portion 20 is high, the visibility of the display image is high, and the visibility of real external scenery is low. In contrast, when the luminance of the display image of the image display portion 20 is decreased, the visibility of the display image is reduced, and the visibility of real external scenery is increased. Since an image displayed in the third embodiment is an external scenery image, the image is similar to real external scenery. For this reason, there is an advantage in that an increase in luminance makes it difficult to confuse an external scenery image which is displayed and real external scenery. On the other hand, there is an advantage in that a decrease in the luminance of the display image makes it possible to secure the visibility of external scenery and display the image.

After the display of the external scenery image is started in step S44, the operation processing unit 164 detects a line of sight by the line-of-sight sensor 68, and determines whether the line of sight has moved (step S45). That is, the operation processing unit 164 determines whether a direction of a user's line of sight has changed over a threshold value which is set in advance from a line-of-sight direction which is previously detected.

When it is determined that the line of sight has not moved (step S45; NO), the operation processing unit 164 repeatedly performs the detection of a line of sight by the line-of-sight sensor 68 and the determination of step S45 at predetermined time intervals. When it is determined that the line of sight has moved (step S45; YES), the operation processing unit 164 specifies a position of a gaze point on the basis of the moved line of sight, and cuts out a portion corresponding to the specified gaze point from the external scenery image acquired in step S12 (step S46).

The display position control unit 165 determines a display position and a size with respect to the external scenery image having been subjected to the cut-out process by the operation processing unit 164 in step S46 (step S47). The operation processing unit 164 updates an image being displayed to the external scenery image having been subjected to the cut-out process in step S46 in accordance with the position and the size which are determined in step S47 (step S48).

Thereafter, the operation processing unit 164 determines whether conditions for terminating a display have been satisfied (step S49). When the conditions for terminating a display have not been satisfied (step S49; NO), the operation processing unit returns to step S45. In addition, when the conditions for terminating a display have been satisfied (step S49; YES), the operation processing unit stops displaying an AR content. Examples of the conditions for terminating the display include the presence of an instruction for the termination which is given by an operation unit 135, the completion of the display of the AR content, and the like.

As described above, in the third embodiment, the control unit 140 of the head mounted display device 100 displays a partial region of the external scenery image acquired by the image acquisition unit 161 on the image display portion 20, and changes the position of the partial region displayed on the image display portion 20 in the external scenery image in association with the direction of the user's line of sight which is detected by the line-of-sight sensor 68. Therefore, the external scenery image is displayed in association with the user's line of sight, and thus it is possible to prevent unconformity between the external scenery which is visually recognized by the user and the display image and to make the user visually recognize the external scenery image. In addition, the display of the external scenery image changes so as to follow a change in the user's line of sight, and thus the external scenery is viewed by the user as if the external scenery moves in accordance with the line of sight. In addition, when the external scenery image includes a range lager than the user's visual field, the range capable of being visually recognized is viewed by the user as if the range is enlarged. In this manner, it is possible to provide a new sense of operation related to the visibility of external scenery by displaying pseudo external scenery in accordance with a user's line of sight and changing the position of the pseudo external scenery.

In addition, the operation processing unit 164 can adjust display luminance of the external scenery image displayed on the image display portion 20, and can allow a display image to be visually recognized more clearly than real external scenery. Thereby, it is possible to make a user pay attention to the external scenery image without confusing the real external scenery and the external scenery image and to make an effect of displaying pseudo external scenery become prominent.

Fourth Embodiment

Figure 18:
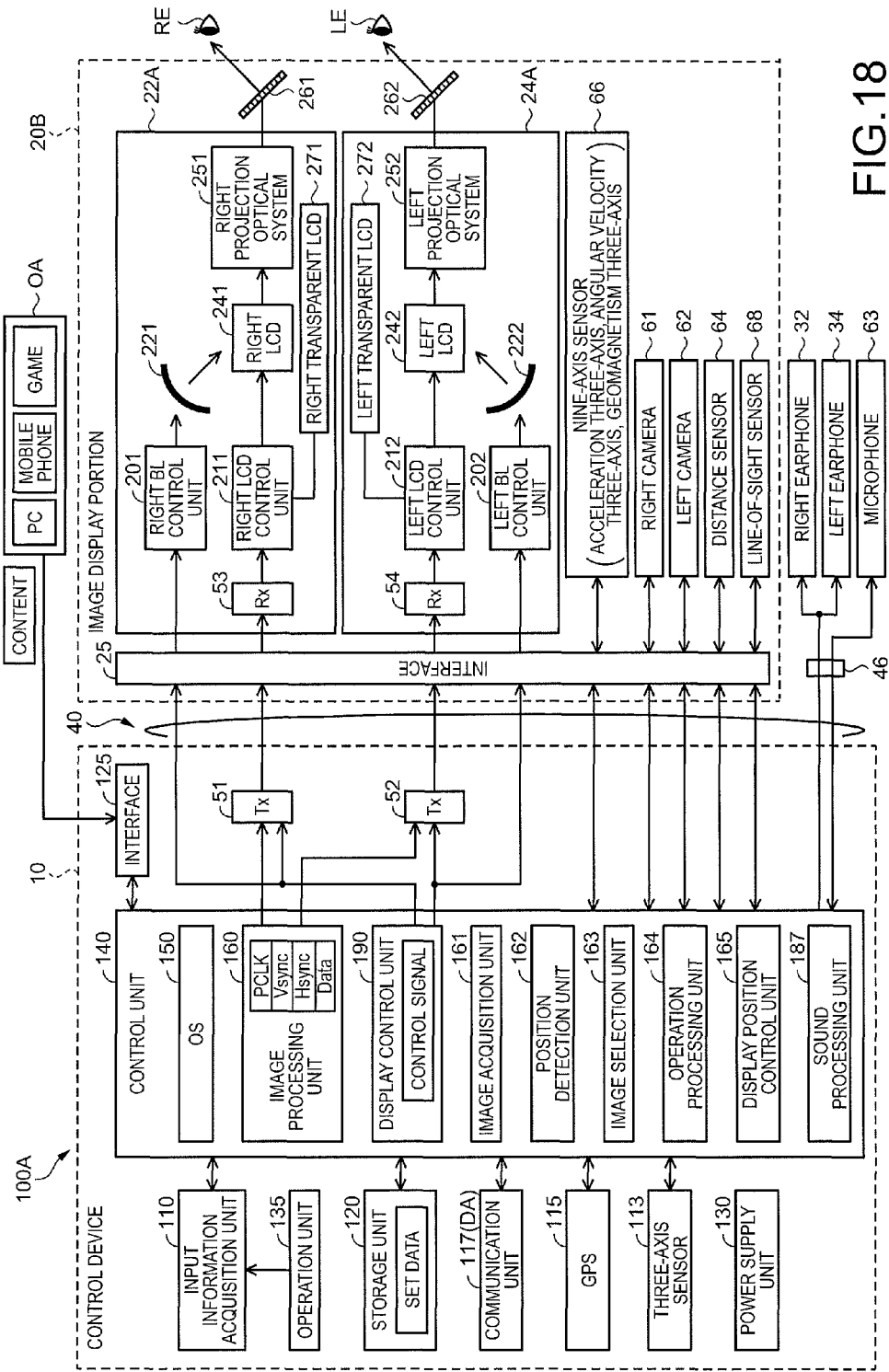
FIG. 18 is a functional block diagram of units constituting a head mounted display device according to a fourth embodiment.

FIG. 18 is a functional block diagram of units constituting a head mounted display device 100A according to a fourth embodiment.

The head mounted display device 100A has a configuration which is common to the head mounted display device 100 of the first embodiment except that the head mounted display device includes a right transparent LCD 271 and a left transparent LCD 272. The common components will be denoted by the same reference numerals and signs, and a description thereof will be omitted here.

In detail, the head mounted display device 100A includes an image display portion 20B that includes a right display driving portion 22A including the right transparent LCD 271 and a left display driving portion 24A including the left transparent LCD 272. The right display driving portion 22A is configured such that the right display driving portion 22 mentioned above is provided with the right transparent LCD 271 constituted by a transmissive liquid crystal display panel and such that the right transparent LCD 271 is driven by a right LCD control unit 211. In addition, the left display driving portion 24A is configured such that the left display driving portion 24 mentioned above is provided with the left transparent LCD 272 constituted by a transmissive liquid crystal display panel and such that the left transparent LCD 272 is driven by a left LCD control unit 212.

Data of an image which is displayed by the right LCD control unit 211 driving the right transparent LCD 271 and data of an image which is displayed by the left LCD control unit 212 driving the left transparent LCD 272 are transmitted from an image processing unit 160 through a transmission unit 51 and a reception unit 53.

Figure 19:
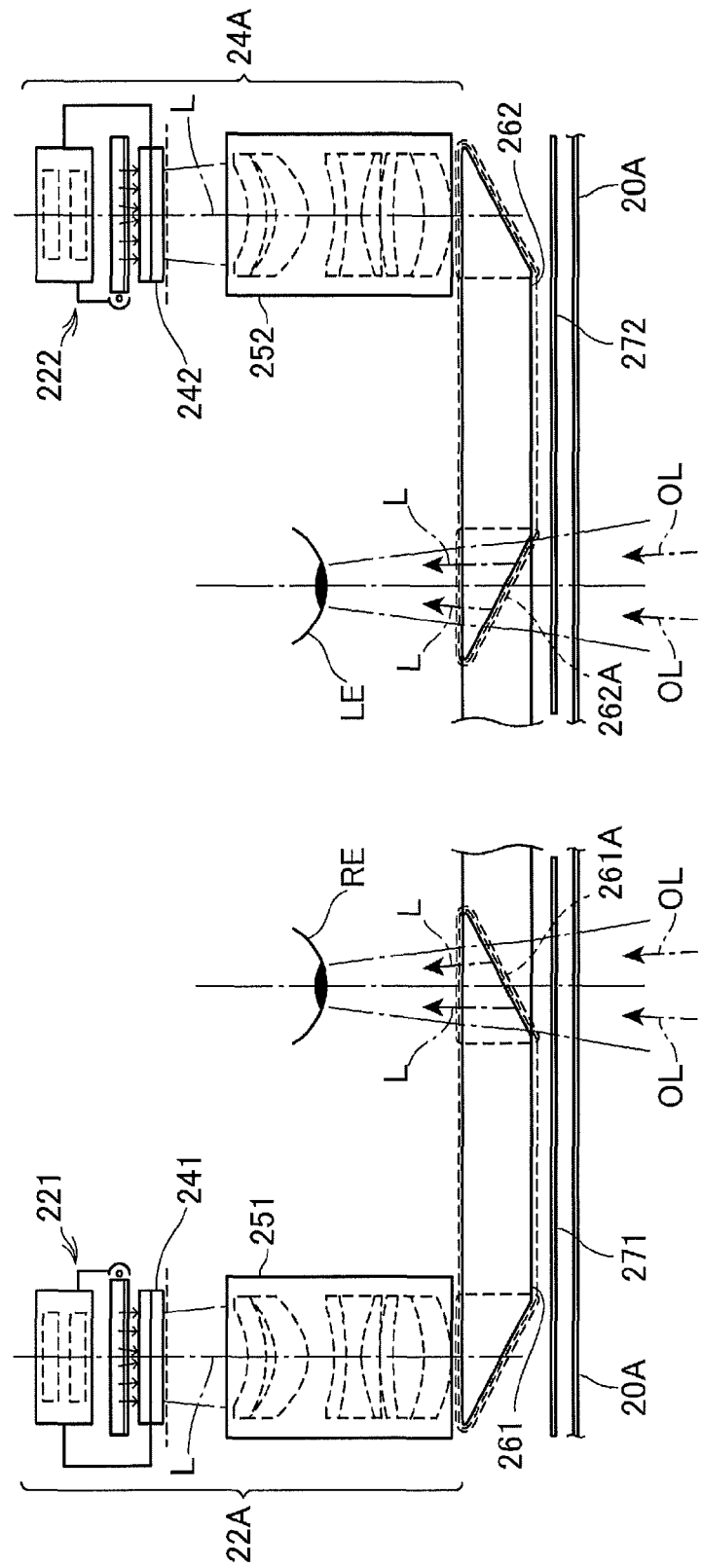
FIG. 19 is a diagram illustrating a configuration of an optical system of an image display portion according to the fourth embodiment.

FIG. 19 is a plan view illustrating main components in a configuration of an optical system included in the image display portion 20B, and illustrates a left eye LE and a right eye RE of a user for a description.

As illustrated in FIG. 19, the right transparent LCD 271 is disposed between a right light guide plate 261 and a light control plate 20A. The right transparent LCD 271 is disposed so as to cover the front of the image display portion 20B of the right light guide plate 261 which is opposite to the user's eyes. The right transparent LCD 271 has light transmittance, and further transmits external light OL passing through the light control plate 20A to the right light guide plate 261 side.

In addition, the left transparent LCD 272 is disposed between a left light guide plate 262 and the light control plate 20A. That is, the left transparent LCD 272 is disposed so as to cover the front of the image display portion 20B of the left light guide plate 262 which is opposite to the user's eyes. The left transparent LCD 272 has light transmittance, and further transmits external light OL passing through the light control plate 20A to the left light guide plate 262 side.

The light transmittance of each of the right transparent LCD 271 and the left transparent LCD 272 is not limited, but it is preferable to transmit external light OL having such an amount that displays on the right transparent LCD 271 and the left transparent LCD 272 can be visually recognized. In addition, it is not required to be able to visually recognize external scenery through the right transparent LCD 271 and the left transparent LCD 272.

Figure 20:
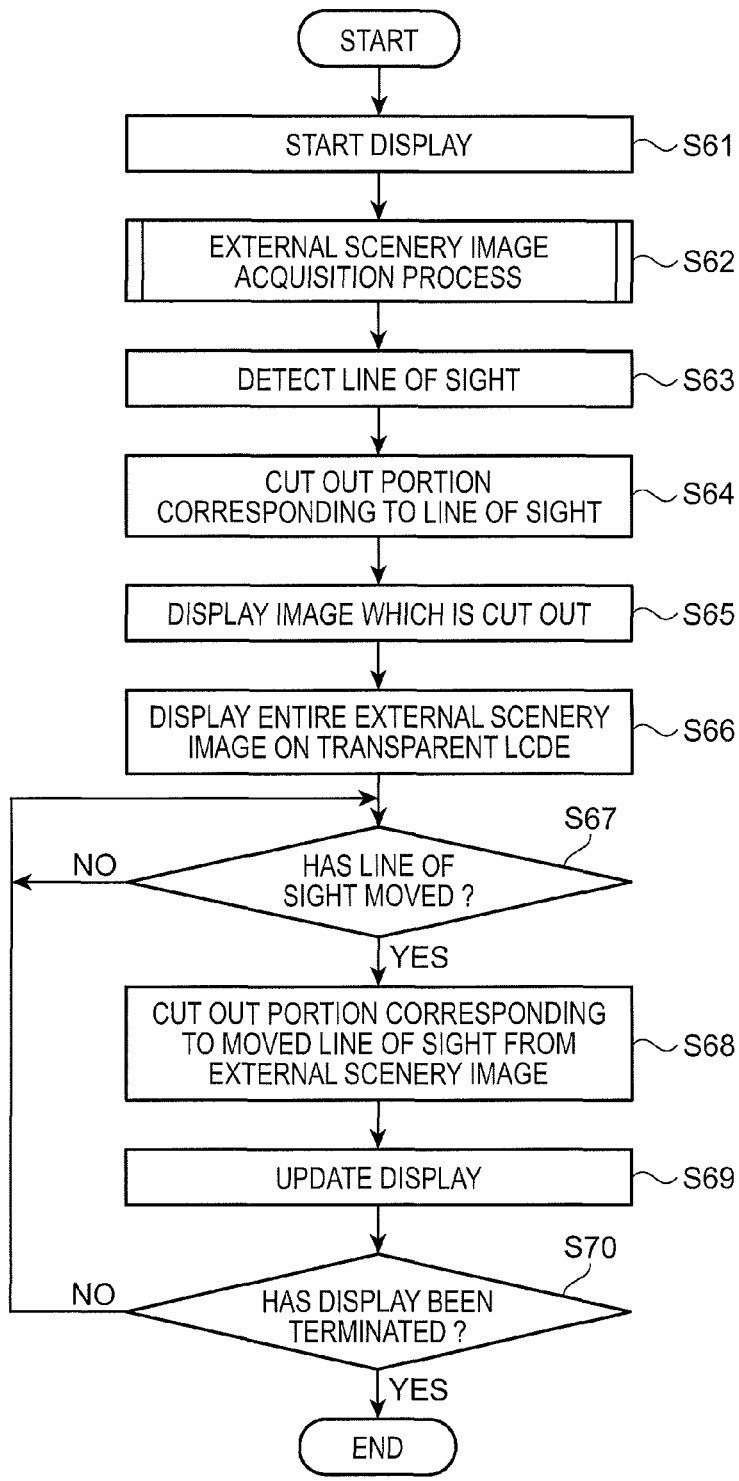
FIG. 20 is a flow chart illustrating an operation of the head mounted display device.
Figure 21A:
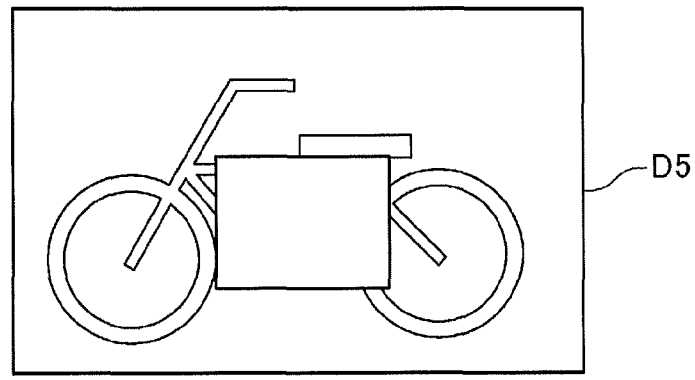
FIGS. 21A to 21C are diagrams illustrating a display example of the head mounted display device.
Figure 21B:
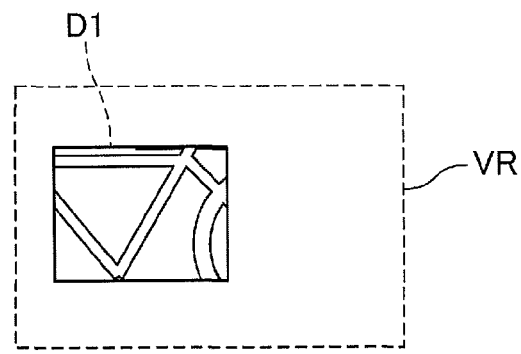
Figure 21C:
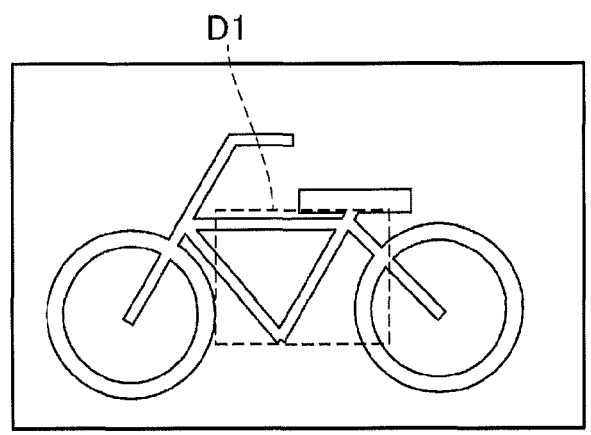

FIG. 20 is a flow chart illustrating an operation of the head mounted display device 100A. In addition, FIGS. 21A to 21C are diagrams illustrating a display example of the head mounted display device 100A. FIG. 21A illustrates an example of displays on the right transparent LCD 271 and the left transparent LCD 272, FIG. 21B illustrates an example of a display using half mirrors 261A and 262A, and FIG. 21C illustrates a state where displays on the right light guide plate 261, the left light guide plate 262, the right transparent LCD 271, and the left transparent LCD 272 overlap each other.

FIGS. 21A to 21C illustrate examples of the right transparent LCD 271 and a field of view VR which correspond to a user's right eye. In a display example corresponding to a user's left eye, the same display as those of FIGS. 21A to 21C or a display having the same contents of which the display position is laterally symmetrical is performed, and thus the illustration thereof will be omitted here.

When a user wears the head mounted display device 100A (step S61) and an instruction for a display of an AR content is given by the operation of an operation unit 135, the operation processing unit 164 performs a process of acquiring an external scenery image (step S62). The operation of step S62 is the same as the operation of step S12 of FIG. 5 in the above-described first embodiment.

The operation processing unit 164 detects a user's line of sight by a line-of-sight sensor 68 (step S63). The operation processing unit 164 specifies a user's gazing direction in a display region on the basis of the detected line of sight, and performs a process of cutting out a portion corresponding to the gazing direction from the external scenery image (step S64).

In step S64, the operation processing unit 164 detects a user's line of sight using the line-of-sight sensor 68, and specifies a user's gazing direction by setting an image display portion 20 as a reference. The reference in this case can be set to be a central position between a right optical image display portion 26 and a left optical image display portion 28 of the image display portion 20, the center between the half mirrors 261A and 262A, or the like. The operation processing unit 164 associates the external scenery image with the direction of the user's line of sight, and specifies a position overlapping the direction of the user's line of sight in the external scenery image, that is, a gaze point.

The operation processing unit 164 displays an image which is cut out from the external scenery image on the basis of the gaze point by the right display driving portion 22A and the left display driving portion 24A (step S65), and then displays the external scenery image by the right transparent LCD 271 and the left transparent LCD 272 (step S66).

In FIG. 21A, a display region of the right transparent LCD 271 is denoted by reference numeral D5. An external scenery image is displayed in the display region D5. The external scenery image includes external scenery capable of being visually recognized when a user wearing the image display portion 20 does not wear the image display portion 20 at the same position and in the same direction. Since the head mounted display device 100A includes the right transparent LCD 271 and the left transparent LCD 272, there is the possibility of external light OL incident on the user's eyes not having such an amount that external scenery can be clearly visually recognized. Consequently, the external scenery image is displayed on the right transparent LCD 271 and the left transparent LCD 272, and the user can recognize external scenery. However, in the display region D5, it is preferable that a display is not performed at a position overlapping the display region D1 illustrated in FIG. 21B. The half mirrors 261A and 262A transmit image light beams of the right transparent LCD 271 and the left transparent LCD 272. For this reason, in order to secure the visibility of display images on the half mirrors 261A and 262A, it is preferable that display images on the right transparent LCD 271 and the left transparent LCD 272 are ranges avoiding the half mirrors 261A and 262A. The display region D5 of FIG. 21A is configured not to be displayed on the half mirror 261A.

As illustrated in FIG. 21B, an image which is cut out from an external scenery image in accordance with the user's line of sight is displayed in the display region D1. In addition, the entire external scenery image illustrated in FIG. 21A is displayed in the display region D5 corresponding to the right transparent LCD 271. An image displayed in the display region D5 and an image displayed in the display region D1 which overlap each other are visually recognized by user's eyes as illustrated in FIG. 21C.

The right transparent LCD 271 and the left transparent LCD 272 may be configured not to have optimized optical characteristics like the right light guide plate 261 and the left light guide plate 262, and thus there is the possibility of the image displayed in the display region D5 appearing to be an unclear image compared to the display region D1. However, as illustrated in FIG. 21C, a clear external scenery image corresponding to a line-of-sight direction is visually recognized by the user in the display region D1, and the entire external scenery image is displayed in the display region D5 as the background thereof. For this reason, the entire external scenery image and a portion of the line-of-sight direction are visually recognized by the user, and thus it is possible to show pseudo external scenery to the user who cannot directly view external scenery. The operation processing unit 164 detects a line of sight by the line-of-sight sensor 68, and determines whether the line of sight has moved (step S67). That is, the operation processing unit 164 determines whether a direction of a user's line of sight has changed over a threshold value which is set in advance from a line-of-sight direction which is previously detected. When it is determined that the line of sight has not moved (step S67; NO), the operation processing unit 164 repeatedly performs the detection of a line of sight by the line-of-sight sensor 68 and the determination of step S67 at predetermined time intervals. When it is determined that the line of sight has moved (step S67; YES), the operation processing unit 164 specifies a position of a gaze point on the basis of the moved line of sight, and cuts out a portion corresponding to the specified gaze point from the external scenery image acquired in step S62 (step S68).

A display position control unit 165 updates an image being displayed by the half mirrors 261A and 262A to the external scenery image having been subjected to the cut-out process in step S68 (step S69).

Thereafter, the operation processing unit 164 determines whether conditions for terminating a display have been satisfied (step S70). When the conditions for terminating the display have not been satisfied (step S70; NO), the operation processing unit returns to step S67. In addition, when the conditions for terminating the display have been satisfied (step S70; YES), the operation processing unit stops displaying an AR content. Examples of the conditions for terminating the display include the presence of an instruction for the termination which is given by the operation unit 135, the completion of the display of the AR content, and the like.

In this manner, the head mounted display device 100A of the fourth embodiment performs a display on the right transparent LCD 271 and the left transparent LCD 272 in combination with a display on the right light guide plate 261 and the left light guide plate 262. The entirety of an AR content (for example, an external scenery image) is displayed on the right transparent LCD 271 and the left transparent LCD 272, and an image obtained by cutting out a portion of the AR content is displayed on the right light guide plate 261 and the left light guide plate 262. Thereby, it is possible to effectively perform an AR display by combining two displays. In addition, the image displayed on the right light guide plate 261 and the left light guide plate 262 may be an image which is cut out from the AR content in accordance with a direction of a user's line of sight. In addition, the image which is cut out from the AR content may be displayed so as to be enlarged or reduced. Further, when the AR content is a captured image obtained by each of a right camera 61 and a left camera 62 or is an external scenery image generated using the captured image, it is possible to make a user visually recognize external scenery in a pseudo manner.

Meanwhile, the invention is not limited to the configurations of the above-described embodiment, and can be implemented in various aspects without departing from the scope of the invention.

In the above-described embodiments, with regard to a range in which a user can visually recognize external scenery through a display unit, a configuration has been described in which the right optical image display portion 26 and the left optical image display portion 28 transmit external light, the external light passing through the right optical image display portion 26 and the left optical image display portion 28 is incident on the user's eyes, and thus the user visually recognizes the external scenery. In this configuration, a description has been given on the assumption that a range capable of being visually recognized through the display unit by the user is a range occupied by the right optical image display portion 26 and the left optical image display portion 28 in the user's field of view (visual field), but the invention is not limited thereto. For example, when there is a range or a region which is not capable of being visually recognized due to a component or an attachment such as a frame included in the image display portion 20 in spite of being a region that overlaps or is included in the right optical image display portion 26 and the left optical image display portion 28 in the user's field of view, the region may be excluded from a "visually recognizable range". In addition, a configuration may be adopted in which data indicating a relative positional relationship between a user's field of view and portions of the right optical image display portion 26 and the left optical image display portion 28 which transmit external scenery is stored in advance in a storage unit 120 or the like. In this case, a range capable of being visually recognized by the user may be set to be a range which is defined by the data stored in the storage unit 120. Further, a configuration may be adopted in which data indicating a relative positional relationship between portions of the right optical image display portion 26 and the left optical image display portion 28 which transmit external scenery, a user's field of view, and display regions of the right optical image display portion 26 and the left optical image display portion 28 on which an image is displayed is stored in advance in the storage unit 120 or the like. The data may include data for specifying sizes of the portions of the right optical image display portion 26 and the left optical image display portion 28 which transmit external scenery and the display regions thereof. In addition, the data may be generated by a control unit 140 by performing calibration in a state where a user is wearing the image display portion 20, and may be stored in the storage unit 120. In the calibration, the control unit 140 may display an image for calibration by the right optical image display portion 26 and the left optical image display portion 28, the user may perform an input or an operation with respect to a positional relationship between the user's field of view and a position at which the image for calibration can be visually recognized, and the control unit 140 may detect the operation, thereby generating the data. In this case, examples of the image for calibration to be used include an image in which a plurality of geometric figures and the like are disposed, and the like.

In addition, a configuration in which a user visually recognizes external scenery through a display unit is not limited to the configuration in which the right optical image display portion 26 and the left optical image display portion 28 transmit external light. For example, the invention can also be applied to a display device that displays an image in a state where external scenery cannot be visually recognized. Specifically, the invention can be applied to a display device that displays a captured image obtained by the right camera 61 and/or the left camera 62, an image or CG which is generated on the basis of the captured image, a video based on video data which is stored in advance or video data which is input from the outside, and the like. This type of display device may include a so-called closed-type display device that cannot visually recognize external scenery. In addition, a display device that displays video data which is input from the outside or an analog video signal without performing processes such as an AR display, an MR display, or a VR display can of course be applied to the invention.

Instead of, for example, the image display portions 20 and 20B, other types of image display portions such as, for example, an image display portion worn like a hat may be adopted, and a display unit that displays an image corresponding to a user's left eye and a display unit that displays an image corresponding to a user's right eye may be provided. In addition, the display device according to the invention may be configured as a head mounted display which is mounted on a vehicle such as, for example, an automobile or an airplane. In addition, the display device may be configured as a head mounted display which is built into a body protection tool such as, for example, a helmet. In this case, a portion that positions a position for a user's body and a portion which is positioned with respect to the portion can be set as mounting portions.

Further, in the above-described embodiments, a description has been given of an example of a configuration in which the image display portions 20 and 20B and the control device 10 are separated from each other and are connected to each other through the connection portion 40, but a configuration may be adopted in which the control device 10 and the image display portion 20 are configured as one body and are to be mounted on a user's head.

In addition, a notebook computer, a tablet computer, or a desktop computer may be used as the control device 10. In addition, portable electronic apparatuses including a game machine, a mobile phone, a smartphone, and a portable media player, other dedicated apparatuses, and the like may be used as the control device 10. In addition, a configuration may be adopted in which the control device 10 is separated from the image display portions 20 and 20B and various signals are transmitted and received between the control device 10 and the image display portions 20 and 20B through wireless communication.

In addition, for example, as a configuration in which image light is generated in the image display portions 20 and 20B, a configuration in which an organic EL (organic electro-Luminescence) display and an organic EL control unit are provided may be adopted. In addition, as a configuration for generating image light, liquid crystal on silicon (LCOS, registered trademark), a digital micromirror device, or the like can be used.

The phrase "display unit" used in the invention is equivalent to a component that emits image light, and the emission of image light by the head mounted display device 100 will be referred to as "display" in the following description.

In the above-described embodiments, a configuration has been described in which image light is generated by the right and left image light generation units described with reference to FIG. 4 and image light beams are emitted toward a right eye and a left eye of a user, respectively, by the right optical image display portion 26 and the left optical image display portion 28 illustrated in FIG. 2 so as to be incident on the right eye and the left eye of the user, respectively. The configuration of the "display unit" is not limited thereto. That is, the configuration of the display unit is not limited to the configurations of FIGS. 2 and 4 as long as the display unit emits image light. For example, in the configuration of this embodiment, image light is emitted toward user's eyes by a "right light guide portion" and a "left light guide portion" which include the half mirrors 261A and 262A, respectively. In addition, as a configuration for generating image light, the right and left backlights 221 and 222 and the right and left LCDs 241 and 242 are provided. The "display unit" does not necessarily have these configurations.

For example, image light generated by a mechanism built into either or both of the right display driving portion 22 and the left display driving portion 24 of the image display portion 20 may be reflected by a reflection mechanism provided on a user side of the image display portion 20, that is, a side facing user's eyes, and may be emitted to the user's eyes. Here, for example, a scanning optical system using a micro electro mechanical system (MEMS) mirror may be adopted as the reflection mechanism. That is, a configuration may be adopted in which a scanning optical system including a MEMS mirror, performing scanning with light emitted by an image light generation unit, is provided and light with which scanning is performed by the scanning optical system is directly incident on user's eyes. In addition, an optical member on which a virtual image is formed by light with which scanning is performed by the scanning optical system may be provided in the image display portion 20. The optical member forms a virtual image by scanning light with which scanning is performed by a MEMS mirror. In this case, a virtual image is formed on a virtual image formation surface by performing scanning with light by the MEMS mirror, and the virtual image is captured by user's eyes, and thus an image is visually recognized (recognized). As an optical component in this case, a component, such as, for example, the right light guide plate 261 and the left light guide plate 262 of the above-described embodiment, which guides light through a plurality of times of reflection may be used, or a half mirror surface may be used.

In addition, the scanning optical system is not limited to a configuration including a MEMS mirror. A mechanism that generates image light may also be a laser light source emitting a laser beam. For example, the invention may also be applied to a laser retina projection type head mounted display. That is, a configuration may be adopted in which a light emitting portion includes a laser light source and an optical system that guides a laser light source to user's eyes, and performs scanning on a retina by making a laser beam incident on the user's eyes to form an image on the retina, thereby allowing the user to visually recognize the image.

In addition, instead of a virtual image formation surface that receives light with which scanning is performed, a configuration may be adopted in which image light is guided to user's eyes using a diffraction grating. In other words, the invention is not limited to a component that guides image light within an optical member, and a component having only a function of guiding image light by refracting and/or reflecting the image light toward user's eyes may be used.

In the configuration in which the scanning optical system including a MEMS and the like is provided, it is possible to change a position at which a user visually recognizes an image, that is, a display position of the image by changing a mounting angle of the scanning optical system in the image display portion 20. Therefore, in a process of changing the display position in each of the above-described embodiments, an operation of changing an angle of the scanning optical system may be performed instead of an operation of changing a display position of an image in the right LCD 241 and the left LCD 242.

In addition, as the optical system that guides image light to user's eyes, a component which includes an optical member transmitting external light incident toward an apparatus from the outside and makes the external light incident on the user's eyes together with image light may be adopted. In addition, an optical member which is positioned in front of user's eyes and partially or entirely overlaps the user's visual field may be used.

In addition, in the above-described embodiments, a configuration has been described in which a virtual image is formed by the half mirrors 261A and 262A in portions of the right optical image display portion 26 and the left optical image display portion 28 which are positioned in front of user's eyes. However, the invention is not limited thereto, and a configuration may be adopted in which an image is displayed in a display region having an area occupying the entirety or majority of the right optical image display portion 26 and the left optical image display portion 28. In this case, an operation of changing a display position of an image may include a process of reducing the image.

Further, the optical element of the invention is not limited to the right light guide plate 261 and the left light guide plate 262 which include the half mirrors 261A and 262A, respectively, and may be an optical component that makes image light incident on user's eyes. Specifically, a diffraction grating, a prism, or a holography display unit may be used.

In addition, at least some of the functional blocks illustrated in FIGS. 4 and 18 may be implemented by hardware or may be configured to be implemented by cooperation between hardware and software, and the invention is not limited to a configuration in which independent hardware resources are disposed as illustrated in FIG. 4. In addition, a program executed by the control unit 140 may be stored in a storage device within the storage unit 120 or the control device 10, or a configuration may be adopted in which a program stored in an external apparatus is acquired through the communication unit 117 or the interface 125 and is executed. Among components formed in the control device 10, only the operation unit 135 may be formed as an independent user interface (UI). In addition, the same components as those formed in the control device 10 may be formed in the image display portion 20. For example, the control unit 140 illustrated in FIG. 4 or 18 may be formed in both the control device 10 and the image display portion 20, or a configuration may be adopted in which the control unit 140 formed in the control device 10 and the CPU formed in the image display portion 20 or 20B have separate functions.

The entire disclosures of Japanese Patent Applications No. 2014-226262, filed on Nov. 6, 2014, and No. 2015-107046, filed on May 27, 2015, are expressly incorporated by reference herein.

What is claimed is:

1. A display device comprising:
    a display having a display region that transmits light from external scenery and displays an image so as to be capable of being visually recognized together with the external scenery; and
    one or more processors,
    wherein a processor among the one or more processors is configured to act as:
    an external scenery image acquisition unit that acquires an external scenery image including the external scenery which is visually recognized through the display unit; and
    a control unit that recognizes an object which is positioned outside a range corresponding to the display region of the display unit on the basis of the external scenery image acquired by the external scenery image acquisition unit, and displays information regarding the object on the display unit, the light within the range being allowed to be incident on a user's eye through the display region so that an AR content is visually recognized as being overlapped with the external scenery through the display region, wherein
    a portion of the acquired external scenery image including an area positioned outside a field of view that includes the range is cut out based on the user's gaze point such that the cut-out portion is displayed on the display region so as to be visually recognized along with the external scenery visible through the display.

2. The display device according to claim 1, wherein when the object is positioned outside a range in which the information is displayed on the display unit, the control unit performs an inducement display for inducing a line of sight to the object by the display unit.

3. The display device according to claim 1, wherein the control unit displays an image of external scenery in a range, which is capable of being visually recognized through the display unit, on the display unit on the basis of the external scenery image acquired by the external scenery image acquisition unit.

4. The display device according to claim 1,
    wherein the display unit, which is a head mounted display unit to be mounted on the user's head, includes a first display unit that displays the image and a second display unit that displays an image visually recognized in a range wider than that of the first display unit on a side closer to external scenery than the first display unit, and
    wherein the control unit performs an inducement display for inducing a line of sight to the object by the second display unit.

5. The display device according to claim 1,
    wherein the display unit, which is a head mounted display unit to be mounted on the user's head, includes a line-of-sight detection unit that detects a line of sight of the user, and
    wherein the control unit changes a display of the display unit in accordance with a direction of the user's line of sight which is detected by the line-of-sight detection unit.

6. The display device according to claim 5, wherein the control unit displays the cut-out portion of the external scenery image acquired by the external scenery image acquisition unit on the display unit, and changes a position of the cut-out portion displayed on the display unit in the external scenery image, in accordance with the direction of the user's line of sight detected by the line-of-sight detection unit.

7. The display device according to claim 1, further comprising an image capturing unit that captures an image of a range including external scenery which is visually recognized through the display unit,
    wherein the external scenery image acquisition unit acquires the image captured by the image capturing unit as the external scenery image.

8. The display device according to claim 7, wherein the external scenery image acquisition unit acquires a plurality of captured images captured by the image capturing unit and compounds the captured images into the external scenery image.

9. The display device according to claim 7, further comprising a plurality of the image capturing units,
wherein the external scenery image acquisition unit acquires a plurality of captured images captured respectively by the plurality of image capturing units, and compounds the captured images into the external scenery image.

10. The display device according to claim 1, further comprising a connection portion which is connected to an external device,
wherein the external scenery image acquisition unit acquires the external scenery image from the external device which is connected to the connection portion.

11. The display device according to claim 10, further comprising a position detection unit that detects a present position,
wherein the external scenery image acquisition unit acquires the external scenery image corresponding to the present position which is detected by the position detection unit from the external device which is connected to the connection portion.

12. The display device according to claim 1, wherein the control unit recognizes the object by extracting an image of the object from the external scenery image acquired by the external scenery image acquisition unit.

13. A display device, which is to be mounted on a user's head, comprising:
a display having a display region that transmits light from external scenery and displays an image so as to be capable of being visually recognized together with the external scenery; and
one or more processors,
wherein a processor among the one or more processors is configured to act as a control unit that recognizes an object which is positioned outside a range corresponding to the display region, and outputs information regarding the object, the light within the range being allowed to be incident on the user's eye through the display region so that an AR content is visually recognized as being overlapped with the external scenery through the display region, wherein
the control unit acquires an external scenery image, and a portion of the acquired external scenery image including an area positioned outside a field of view that includes the range is cut out based on the user's gaze point such that the cut-out portion is displayed on the display region so as to be visually recognized along with the external scenery visible through the display.

14. The display device according to claim 13, wherein when the object is positioned outside a range capable of being visually recognized through the display unit, the control unit outputs information for inducing the user to be in a state where the object is capable of being visually recognized.

15. The display device according to claim 13, wherein when the object is visually recognized through an outer side of the display region in the display unit, the control unit outputs the information for inducing the user to be in a state where the object is capable of being visually recognized through the display region.

16. The display device according to claim 13, wherein the control unit displays a character and/or an image constituting the information in a display region of the display unit.

17. The display device according to claim 13, further comprising a sound output unit that outputs a sound,
wherein the control unit outputs a sound constituting the information by the sound output unit.

18. The display device according to claim 13, wherein the control unit acquires positional information indicating a position of the object, obtains relative positions of a range which is visually recognized by the user through the display region and the object on the basis of the acquired positional information, and outputs the information.

19. The display device according to claim 13, wherein the control unit acquires the external scenery image by capturing an image of the external scenery, obtains relative positions of a range which is visually recognized by the user through the display region and the object on the basis of the acquired external scenery image, and outputs information relating to the relative positions.

20. A non-transitory computer readable medium causing a computer, which controls a display device including a display unit having a display region that transmits light from external scenery and displays an image so as to be capable of being visually recognized together with the external scenery, to function as:
a control unit that recognizes an object which is positioned outside a range corresponding to the display region, and outputs information regarding the object, the light within the range being allowed to be incident on a user's eye through the display region so that an AR content is visually recognized as being overlapped with the external scenery through the display region, wherein
the control unit acquires an external scenery image, and a portion of the acquired external scenery image including an area positioned outside a field of view that includes the range is cut out based on the user's gaze point such that the cut-out portion of the acquired external scenery image is displayed on the display region so as to be visually recognized along with the external scenery visible through the display.

* * * * *